US012067384B2

(12) United States Patent
Hoarty

(10) Patent No.: US 12,067,384 B2
(45) Date of Patent: Aug. 20, 2024

(54) CONSUMER DEVICE FIRMWARE UPDATING VIA HDMI

(71) Applicant: Vizio, Inc., Irvine, CA (US)

(72) Inventor: W. Leo Hoarty, Morgan Hill, CA (US)

(73) Assignee: Vizio, Inc., Irvine, CA (US)

( * ) Notice: Subject to any disclaimer, the term of this patent is extended or adjusted under 35 U.S.C. 154(b) by 77 days.

(21) Appl. No.: 17/827,139

(22) Filed: May 27, 2022

(65) Prior Publication Data

US 2022/0382535 A1    Dec. 1, 2022

Related U.S. Application Data

(60) Provisional application No. 63/194,653, filed on May 28, 2021.

(51) Int. Cl.
*G06F 8/65* (2018.01)
*G06F 1/08* (2006.01)
*G06F 1/12* (2006.01)

(52) U.S. Cl.
CPC ............... *G06F 8/65* (2013.01); *G06F 1/08* (2013.01); *G06F 1/12* (2013.01)

(58) Field of Classification Search
CPC .............................. G06F 8/65; G06F 1/08–12
USPC .................................................. 717/168–174
See application file for complete search history.

(56) References Cited

U.S. PATENT DOCUMENTS

| 5,808,722 A * | 9/1998 | Suzuki ................. G11B 27/105 |
| | | 386/E5.017 |
| 6,801,707 B1 * | 10/2004 | Harumoto .............. G11B 27/10 |
| | | 386/E9.013 |
| 6,924,637 B2 * | 8/2005 | Casey ................. G01R 31/2889 |
| | | 324/754.08 |
| 7,565,649 B2 * | 7/2009 | Sasabe ............... H04N 21/4135 |
| | | 717/169 |
| 8,214,654 B1 * | 7/2012 | Wyatt ................. H04L 63/0478 |
| | | 713/191 |
| 8,583,951 B2 * | 11/2013 | Kuno ..................... H04N 7/163 |
| | | 713/323 |
| 8,972,965 B2 * | 3/2015 | Chung ................. H04N 21/443 |
| | | 348/719 |

(Continued)

FOREIGN PATENT DOCUMENTS

| CN | 103607679 A | 2/2014 |
| CN | 107743211 A | 10/2017 |

OTHER PUBLICATIONS

Teng et al, "Firmware over the Air for Home Cybersecurity in the Internet of Things", IEEE, pp. 123-128 (Year: 2017).*

(Continued)

*Primary Examiner* — Anil Khatri
(74) *Attorney, Agent, or Firm* — Hansen IP Law PLLC

(57) ABSTRACT

Systems and methods for updating firmware in an audio device, such as a soundbar, operatively connected to a Smart TV, are shown and described. Firmware update data is transmitted to the audio device via an audio return channel (ARC) of an HDMI cable. In certain of the systems, the firmware update data is transmitted to the audio device when no audio is being transmitted to or played by the audio device. In other systems, the firmware update data and real-time audio data are multiplexed by the Smart TV and are sent to the audio device via the audio return channel for subsequent demultiplexing and playback of the audio.

23 Claims, 17 Drawing Sheets

(56) References Cited

U.S. PATENT DOCUMENTS

| | | | |
|---|---|---|---|
| 9,767,318 B1* | 9/2017 | Dropps | G06F 21/72 |
| 10,579,365 B2* | 3/2020 | Sung | H04L 67/34 |
| 11,114,133 B2* | 9/2021 | Zhou | G11B 20/00007 |
| 11,115,617 B2* | 9/2021 | Wolff | H04N 21/43635 |
| 11,681,515 B2* | 6/2023 | Nagarathnam | H04L 63/123 |
| | | | 717/173 |
| 2008/0172708 A1* | 7/2008 | Perry | H04W 72/30 |
| | | | 725/110 |
| 2009/0133012 A1* | 5/2009 | Shih | H04N 21/6543 |
| | | | 717/169 |
| 2012/0072896 A1 | 3/2012 | Watanabe et al. | |
| 2012/0079473 A1 | 3/2012 | Watanabe et al. | |
| 2020/0351465 A1* | 11/2020 | Wolff | H04N 21/43635 |

OTHER PUBLICATIONS

Choi et al, "Secure Firmware Validation and Update for Consumer Devices in Home Networking", IEEE, pp. 1-6 (Year: 2016).*

Bettayeb et al, "Hyperledger-Based Secure Firmware Update Delivery for IoT Devices", ACM, pp1-5 (Year: 2021).*

Kim et al, "Remote Progressive Firmware Update for Flash-Based Networked Embedded Systems", ACM, pp. 407-412 (Year: 2009).*

Pekez et al, "Firmware Update Procedure for Audio Systems based on CS4953xx DSP family", IEEE, pp. 29-34 (Year: 2018).*

Asokan et al, "ASSURED: Architecture for Secure Software Update of Realistic Embedded Devices", IEEE, pp. 2290-2300 (Year: 2018).*

English translation of CN103607679 from Total Patent.

English translation of CN107743211 from Google Patent.

Cohen, Simon, HDMI ARC and eARC: The One-Cable Solution for TV Audio, Fully Explained. Nov. 19, 2021. digitaltrends—https://www.digitaltrends.com/home-theater/hdmi-arc-explained-works-care/.

\* cited by examiner

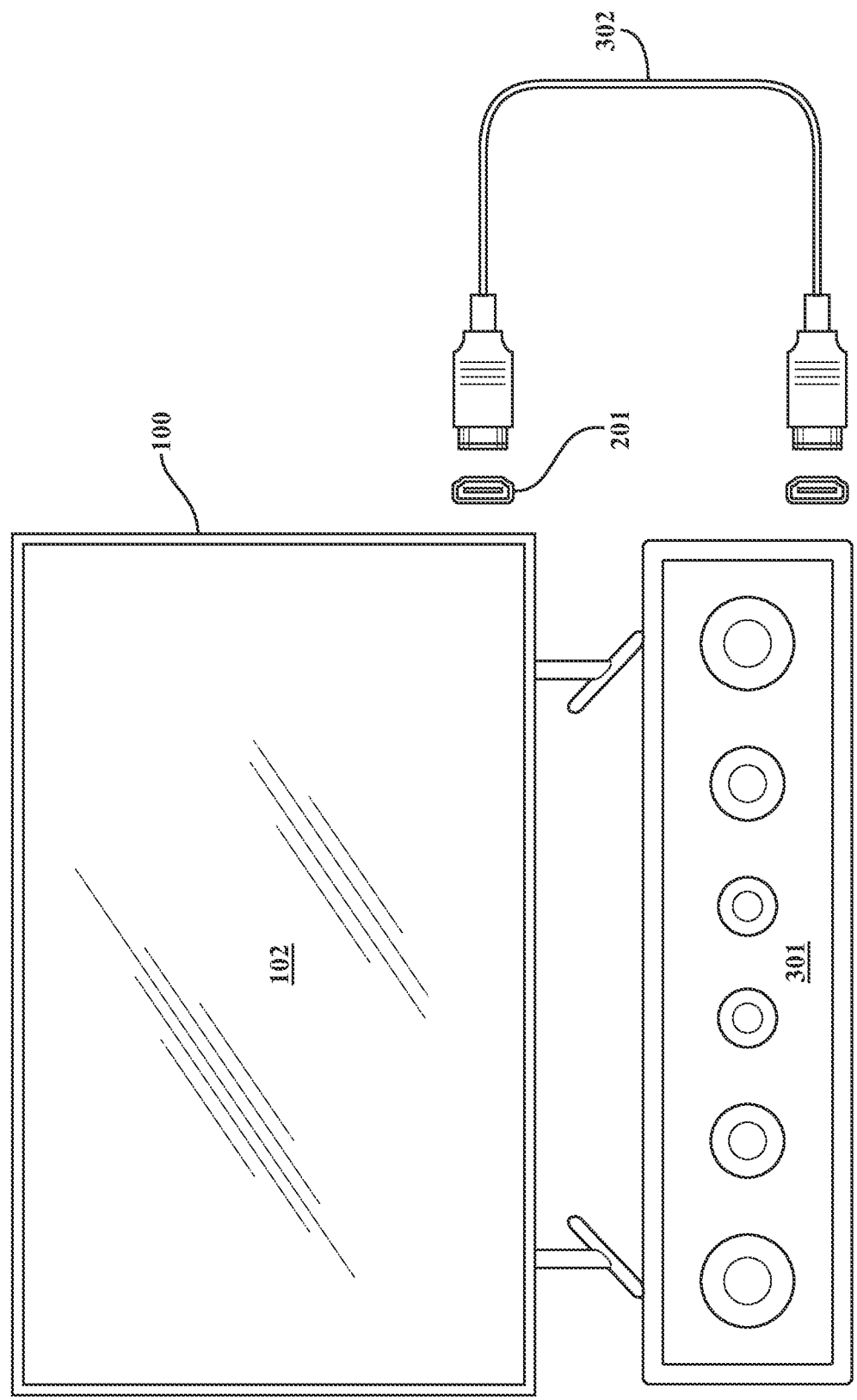

CONSUMER DEVICE FIRMWARE UPDATING VIA HDMI

CROSS REFERENCE TO RELATED APPLICATIONS

This application claims the benefit of U.S. Provisional Patent Application No. 63/194,653, filed May 28, 2021, the entirety of which is hereby incorporated by reference.

FIELD

The present disclosure relates to methods of updating firmware in consumer electronic devices that do not have internet connectivity, and more specifically, to methods of updating the firmware in audio devices such as soundbars connected to an internet-connected TV via an HDMI ARC cable.

BACKGROUND

Consumer electronics products have become increasingly complex employing technology previously only found in complex and expensive commercial equipment for industry and business. Popular consumer devices now containing microprocessor-based systems include home thermostats, smoke alarms, security cameras, automated home lighting control systems, and automated lawn watering timers. There are semi-autonomous vacuum cleaners that roll around the home while cleaning floors and rugs, refrigerators connected to the Internet so that its contents can be remotely viewed via a smartphone app while the owner is at the grocery store, and many more examples.

Consumer electronic products of all kinds often now contain digital processing subsystems, usually in the form of a system-on-a-chip (SoC), for various application specific processing. This is an integrated circuit that holds many of the same components of a computer such as a central processing unit (CPU), memory, Input/Output (I/O) ports and application specific interfaces, all included on a single silicon substrate. As essentially computing devices, many of these smart consumer products require periodic firmware updates to add features, correct firmware bugs, or to improve the security when these devices connect to the Internet. However, many such devices, including TV soundbars, contain programmable SoCs but do not, for economic reasons, support a connection to the Internet.

Consumers have long been accustomed to their personal computers, mobile phones, and tablets performing periodic updates to their operating systems. This often occurs at inconvenient times, after notifying the user to be sure there is sufficient battery life or to plug it in to its charger. The software apps on these devices also periodically require updates such that it may seem that some device in the household is updating some software almost every day.

With the rapid advance of microcomputing technology, this update regime is occurring more frequently in the various smart home appliances mentioned above. In fact, consumer electronics devices that contain microprocessor-based systems, typically utilize the Linux operating system or Android, which is derived from Linux, and some are nearly as capable in their computing power as the laptops that most use every day. These intelligent devices execute complex computer programs that also occasionally benefit from software updates, whether to correct a potential security breech or to add features to the device.

The most common means of facilitating such update processes is by means of the consumer linking the smart device to the home local area network and registering the product, usually from a laptop, on the manufacturer's website or by means of the manufacture's mobile app downloaded from an app store onto a mobile device. Once connected to the Internet, the device is in some cases periodically queried for usage data from the device to the manufacturer as well as the device periodically receiving software updates from the manufacturer. In some cases, the update is announced via a display on the device or by means of a control app on the user's mobile phone. The user then has the option to accept the update or schedule it for another time. In other modes, the devices are automatically updated upon receipt of an update software transfer, usually upon meeting certain conditions typically involving the time of day or if the device is actively operating or both.

For many reasons, soundbars do not typically connect to the Internet since there is little need to do so. To connect to the Internet, the sound bar would then need some sort of keypad and possibly a small display to control the interaction with the user. Yet another complication would be that such an Internet connection would usually be accomplished by means of Wi-Fi. The cost of this additional technology is not warranted due to its occasional use which would typically be only once or twice per year. Hence, manufacturers of the more sophisticated soundbars that may require occasional updating of their internal processing system have limited options. Either a user must manually download the correct firmware from the manufacturer's support website, copy it to a USB thumb drive, and then manually update the target device, or a physical USB drive needs to be mailed to end users to update the soundbar firmware by, for example only, utilizing a USB port connection and inserting received USB drives with firmware updates that the user then performs manually. Many consumers are uncomfortable performing these operations. So, relying on firmware updates that are stored on a USB drive and then mailed to the user is an expensive, inefficient, and unreliable means to update firmware in consumer electronics.

This process can be hazardous for the product. For example, if the user were to power off a device, either intentionally thinking the process has completed or inadvertently by tripping over the power cord and unplugging the device while the device is still in the process of the firmware update, then the device could be rendered inoperable. This problem is so widespread that it even has developed a colloquial term. The user is said to have "bricked" the device because it is then "as useful as a brick" and must now be returned to the factory.

Hence, there is a need for a more reliable process to manage firmware updating of certain consumer devices and particularly in the product category of the soundbars that are increasing in technological complexity are increasingly becoming an important part of home entertainment systems.

SUMMARY

In accordance with a first aspect of the present disclosure, a television is provided which comprises a multiplexer configured to multiplex audio data and firmware update data for an audio device and transmit multiplexed audio data and firmware update data to the audio device.

In accordance with a second aspect of the present disclosure, a system for updating firmware of an audio device is provided which comprises an audio device connected to a television via an HDMI ARC cable, wherein the television is configured to transmit firmware update data to the audio device via an audio return channel of the HDMI ARC cable, and the audio device comprises a demultiplexer configured to demultiplex multiplexed audio data and firmware update data.

In accordance with a third aspect of the present disclosure, a television configured to update the firmware in a connected audio device is provided. The television comprises an audio data buffer having an audio data signal input and an audio data buffer signal output; a firmware data buffer having a firmware data signal input and a firmware data buffer signal output; and a firmware data and audio data multiplexer having a first input operatively connected to the audio data buffer signal output, a second input operatively connected to the firmware output buffer signal output, and an output operatively connected to the audio device input via an audio return channel of an HDMI ARC cable. A system for updating the firmware of an audio device is provided comprising the foregoing television, an audio device comprising an audio processor, a central processing unit, and a demultiplexer, wherein the demultiplexer comprises a multiplexed data signal input, a demultiplexed firmware update data signal output operatively connected the central processing unit and a demultiplexed audio data signal output operatively connected to the central processing unit.

In accordance with a fourth aspect of the present disclosure, a method of updating firmware in an audio device connected to a television is provided. The method comprises receiving an audio data signal, receiving a firmware update data signal, multiplexing the audio data signal and the firmware update signal to create a multiplexed signal, and transmitting the multiplexed signal to the audio device.

In accordance with a fifth aspect of the present disclosure, a method of updating firmware in an audio device is provided. The method comprises receiving a data signal comprising multiplexed audio and firmware update data signals; and demultiplexing the multiplexed audio and firmware signals; and to define a demultiplexed audio signal and a demultiplexed firmware update signal; and playing the demultiplexed audio signal.

BRIEF DESCRIPTION OF THE DRAWINGS

FIG. 3 illustrates the connection from the Smart TV of FIG. 1 to a sound bar using an HMDI ARC cable;

DETAILED DESCRIPTION

Figure 1:
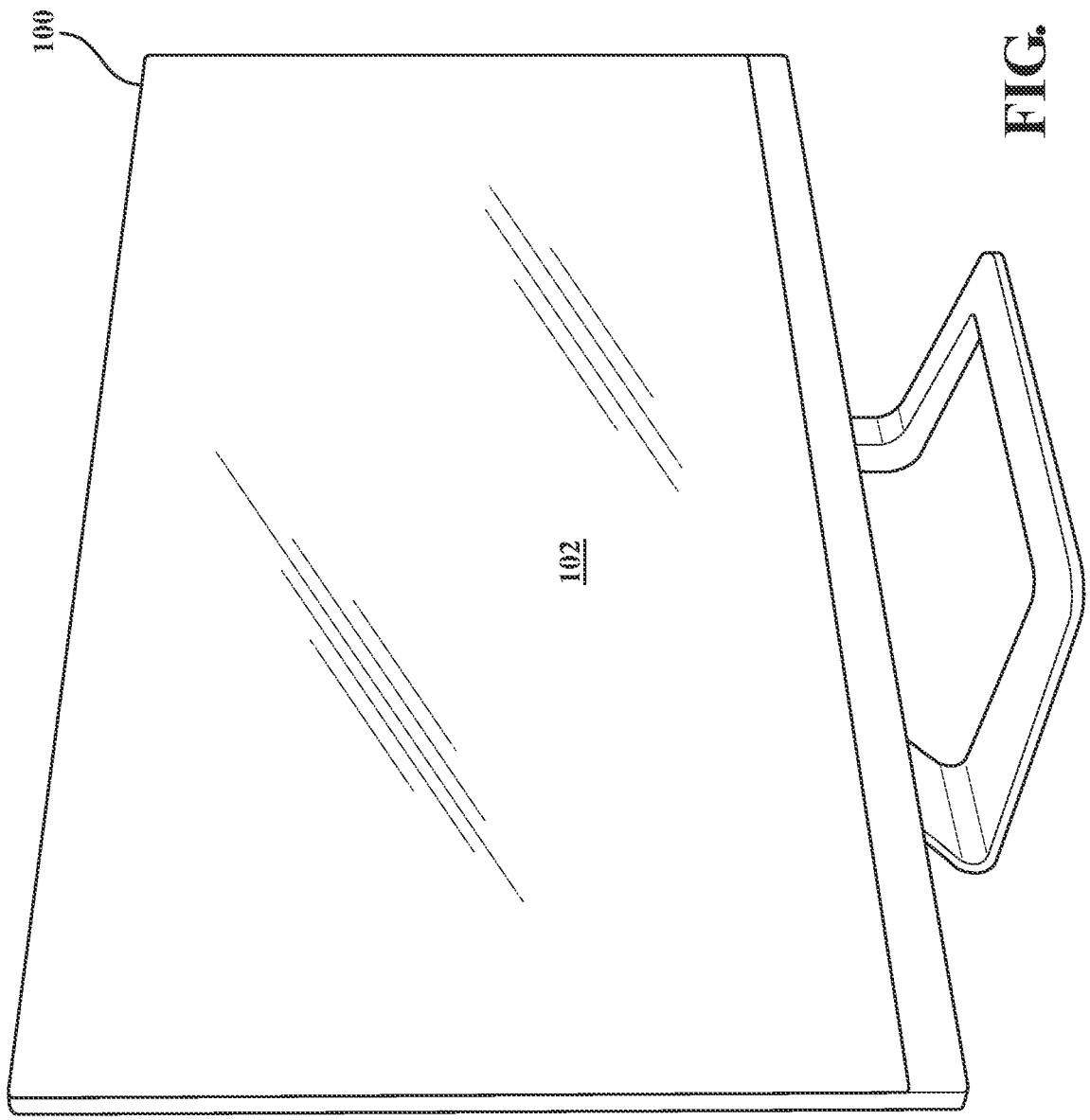
FIG. 1 depicts a Smart TV television with internal processing of audio and video.
Figure 2:
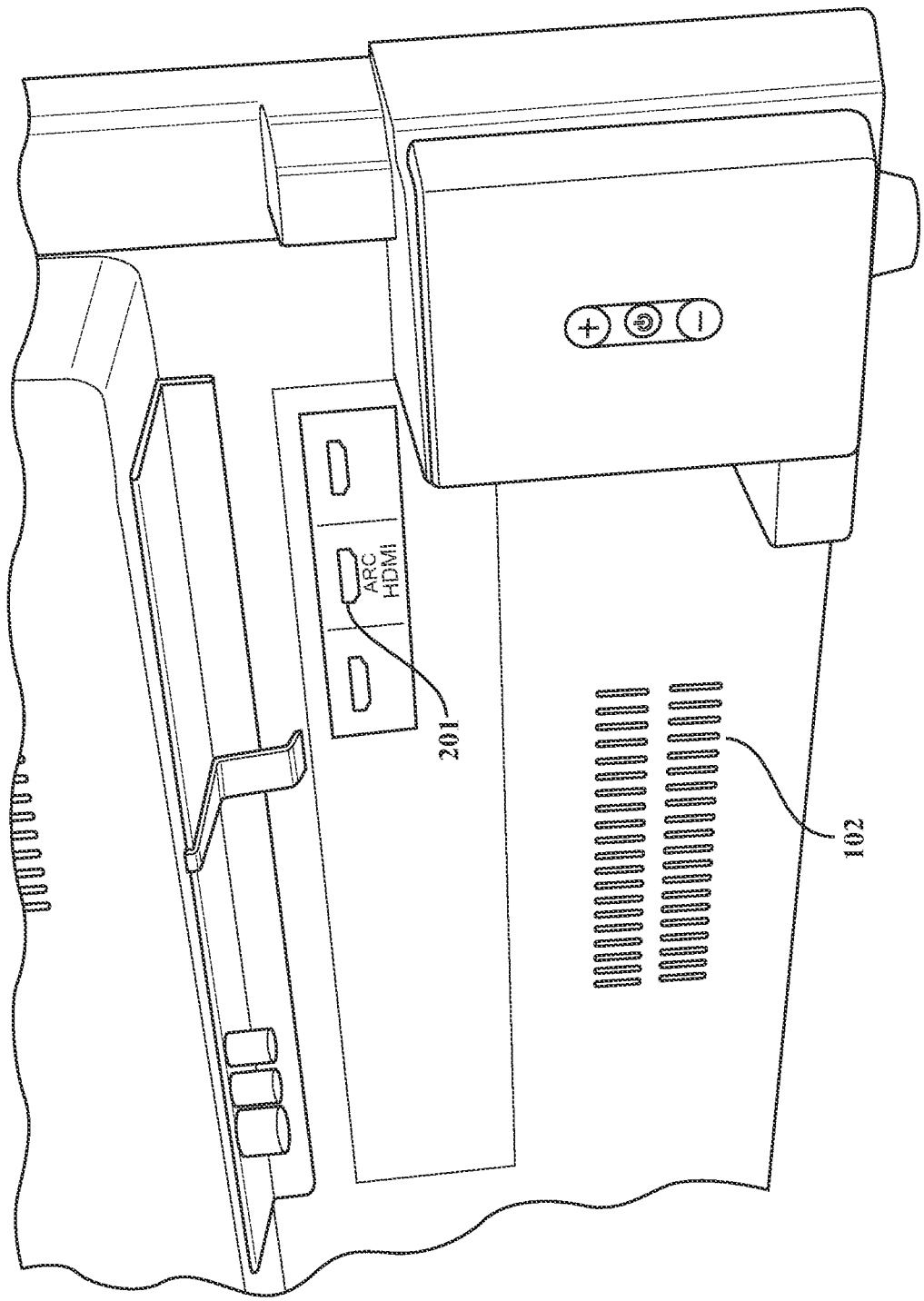
FIG. 2 shows the location of the HDMI ARC connection on the Smart TV of FIG. 1.
Figure 4B:
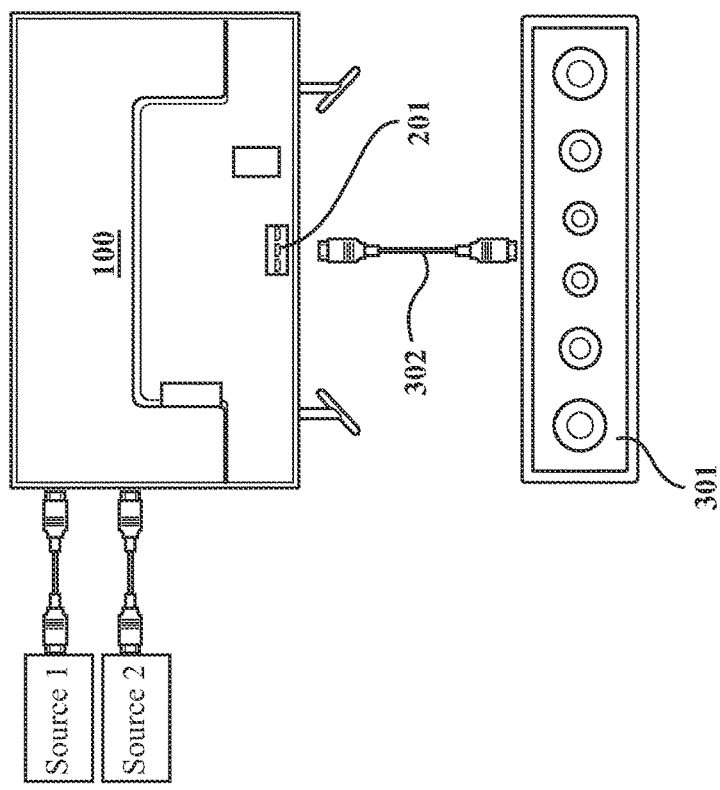
FIGS. 4A and 4B illustrate audio-visual systems comprising the Smart TV of FIG. 1 connected to a surround-sound home theatre system and a soundbar, respectively via an HDMI ARC cable.
Figure 4A:
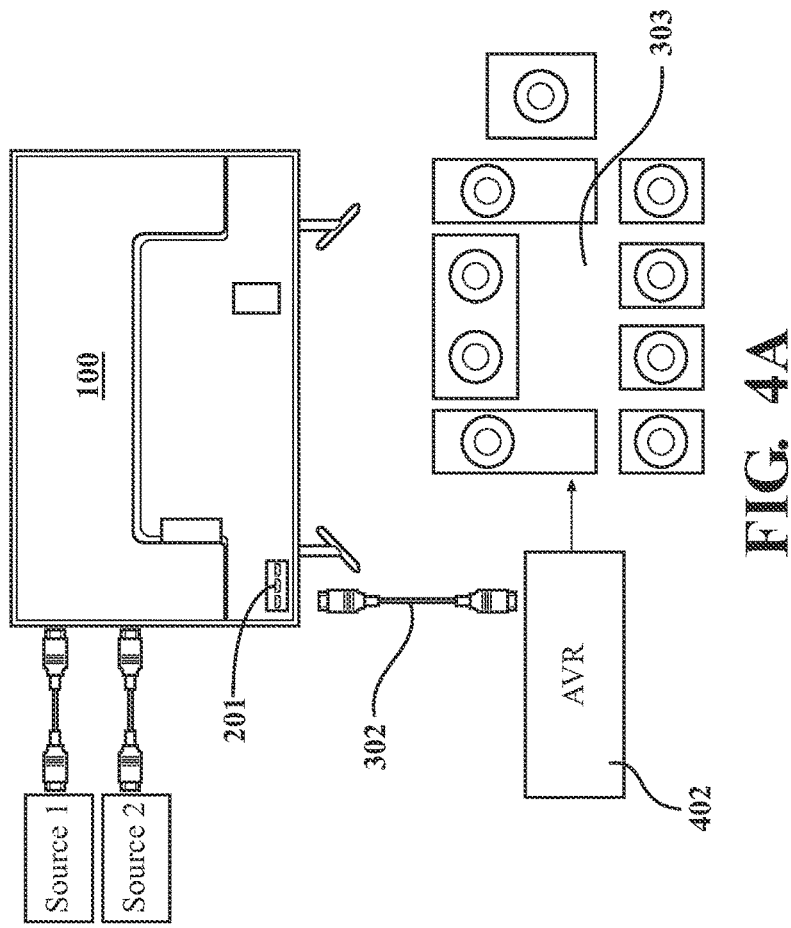
Figure 5:
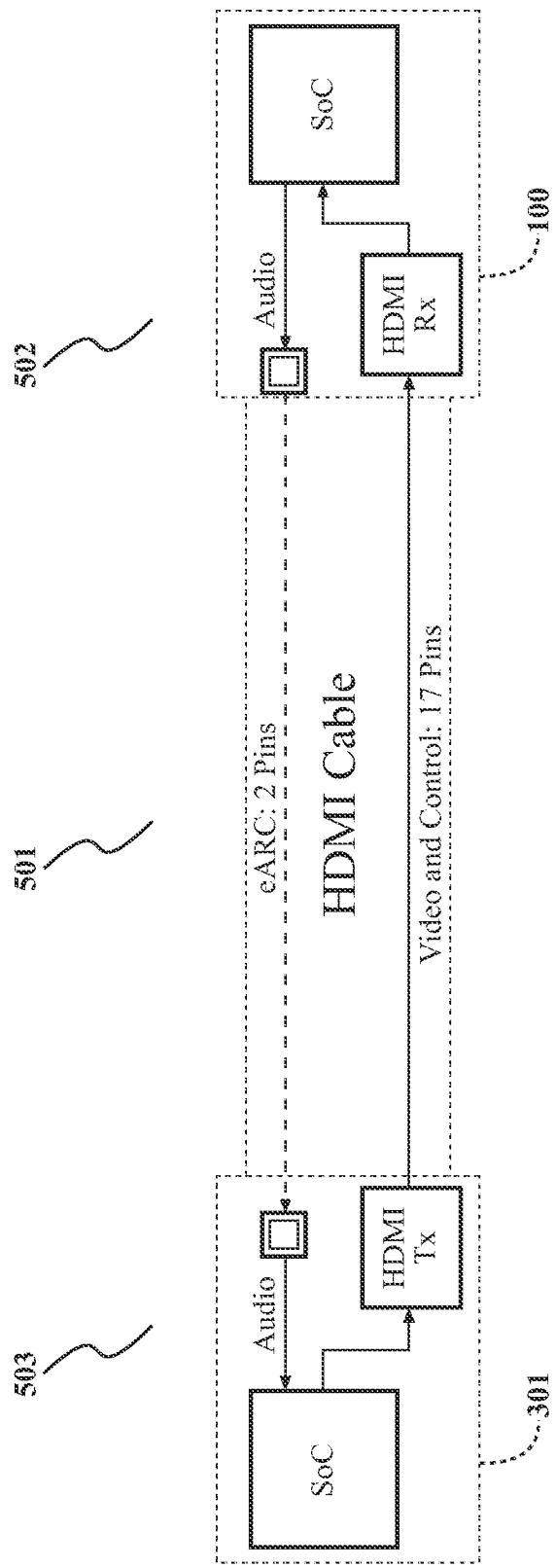
FIG. 5 illustrates the ARC/eARC communication path between the television and the sound bar via two pins of the HDMI ARC cable.
Figure 6:
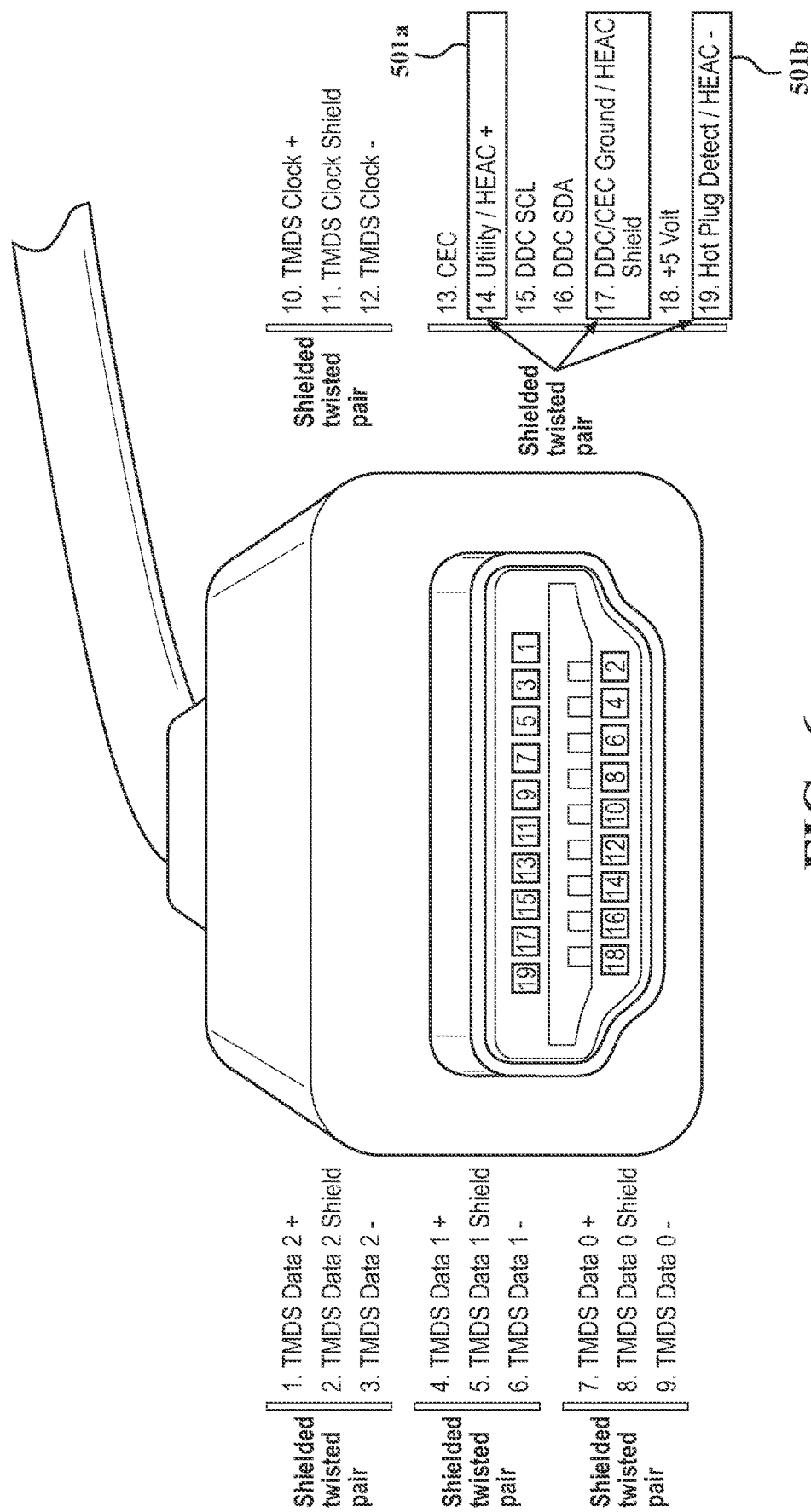
FIG. 6 is a diagram of the pins used by various components of the HDMI cable used to connect a TV and a sound bar.
Figure 7:
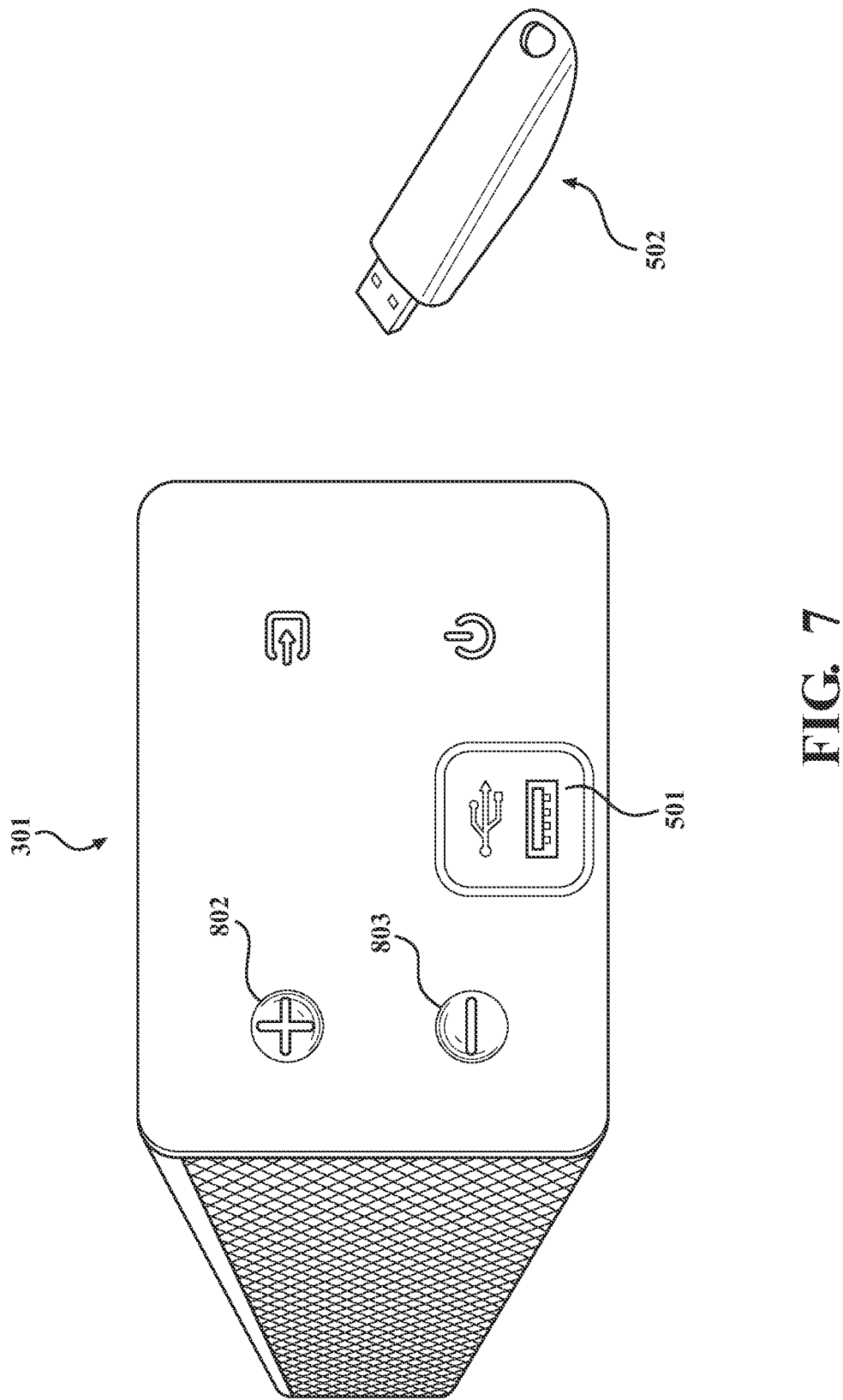
FIG. 7 depicts an example of the device control buttons on a typical sound bar including illustrating a typical USB port for firmware updates where the user inserts a USB storage device containing firmware updates for the sound bar.

As set forth above, HDMI provides a signal path for video and audio as well as a data path for certain control and metadata (information about a television program, for example) but does not support a path for data transfer for firmware updates to a client device. As a result, there remains a need to transfer data between various home entertainment devices using the existing HDMI interconnect for applications such as firmware updates apart from the existing program and control signals. This need may be addressed by repurposing the HDMI ARC path from a TV to its associated soundbar so that it also carries firmware update data, instead of just audio information, for the purpose of updating the firmware on a soundbar. In one embodiment, firmware update data sent via HDMI ARC is modulated onto the ARC path utilizing, for example, the same data modulation protocol as the ARC channel utilizes, the Sony/Philips Digital Interface (S/PDIF). The system of this disclosure temporarily terminates the normal use of the HDMI ARC connection of carrying audio while the data is transferred to the soundbar, whereupon the completion and verification of the data transferred, normal audio signally is reestablished.

In another embodiment, the system of this disclosure provides a means to avoid interrupting the audio signal and, at any time, simultaneously send independent firmware update data via the ARC/eARC pathway. This embodiment employs a data multiplexing process that mixes the data with the audio to send to the attached device such as a sound bar. A process of the attached device then demultiplexes the received combined data stream into separate audio and data pathways as will be descripted later in this document.

One of the most complex devices in the home is the smart TV 100 which is rapidly growing in capability with an increasingly sophisticated internal processor system 102 capable of voice recognition, content recognition, facial recognition via a built-in camera, and many more features. Increasingly, an audio device known as a soundbar 301 is becoming common place, mounted in front of and plugged into, the smart TV 100. This connection is usually via the High-Definition Multimedia Interface (HDMI) utilizing the Audio Return Channel (ARC) 201, a reverse pathway for sending audio from the TV to the soundbar providing far better-quality audio than the TV's built-in speakers.

The inventors have discovered that the audio return channel of an HDMI ARC cable can be re-purposed to deliver firmware updates received by the TV via the Internet to a consumer electronic device that has no Internet connectivity, such as a soundbar or similar audio device. The High-Definition Multimedia Interface (HDMI) has been the standard digital connection for flatscreen TVs, video projectors, and other audio/video (AV) equipment for over twenty years. During that time, it has evolved into a ubiquitous connection, carrying a multiplicity of various video and audio formats as well as control signals between consumer electronics devices via the Consumer Electronics Control (CEC) path. The HDMI Audio Return Channel (ARC) was introduced in 2009 as a protocol that extends the HDMI standard and simplifies a complex A/V entertainment system by reducing the number of cables needed. Since then, a higher bandwidth version of ARC has been released, called "eARC", which can support the bandwidth requirement of contemporary audio surround sound systems such as Dolby Atmos. As HDMI is now effectively ubiquitous in the consumer home entertainment center, many more uses of this interconnect can be applied.

HDMI was initially promoted as a convenient way to send high-quality digital picture and sound signals from a source, such as a cable TV set-top box, to a TV, amplifier, or soundbar. As HDMI has become the de facto A/V interconnect, traditional analog sockets, such as individual left and right audio cables and component video, have become obsolete. The HDMI interface has evolved over the years, with new versions (HDMI 2.1 is current) that support new audio and video technologies such as 3D, 4K, 8K, HDR video formats, as well as high frame rate video and sophisticated audio formats, such as Dolby Atmos, involving many subchannels of audio.

As noted above, the HDMI ARC protocol was added to the HDMI standard in 2009 when introduced as part of HDMI version 1.4. The complexity involved in setting up a home entertainment system can still be daunting for the typical home user. Such a user might have a TV set-top box, games console, and a Blu-ray player, each connected to the TV via HDMI. Additionally, that user might have a smart TV that is using built-in entertainment apps for streaming services such as, NETFLIX® audio-video content streaming, HULU® audio-video content streaming, HBO MAX® entertainment services, and Amazon's PRIME VIDEO® education and entertainment services. In all these examples, the smart TV's small, built-in speakers provide low-quality audio for any program type and especially poor audio for watching movies. The rapid increase in sales of audio soundbars that connect to the TV indicates user's dissatisfaction with built-in audio. For those who demand more, home cinema speaker systems utilizing discrete speakers place around the room are becoming more common.

Using a typical approach, prior to ARC, the prospective home user would connect the audio device to a source or sources of audio/visual content, such as a set-top box, Blu-Ray player, DVD player, etc. The user would connect the audio device to the TV via an HDMI cable to provide the video portion of the audio-visual content to the TV. However, in order to play audio from audio-visual content sources that were connected directly to the TV, such as from internet-provided streaming applications, the user had to connect the TV to the soundbar with an optical cable. HDMI ARC eliminated the need for the optical cable as the audio content from the streaming apps could be sent to the soundbar via the audio return channel of the HDMI ARC cable.

Enhanced Audio Return Channel (also known as eARC) is the next generation of ARC as implemented in the most recent HDMI 2.1 specification. The main benefit of eARC is a significant boost in bandwidth and speed. This enables users to send higher-quality audio from their TV to a soundbar or AV receiver. There is scope for eARC to deliver up to 32 channels of audio, including eight-channel, 24 bit/192 kHz uncompressed data streams at speeds of up to 38 Mbps. A technical challenge to this approach is that it assumes that all the high bitrate formats currently available on Blu-ray discs, 4K Blu-rays and some streaming services such as Dolby TrueHD, DTS-HD Master Audio as well as the object-based formats such as Dolby Atmos and DTS:X, must be compatible.

Besides transferring both video and audio in a single feed, HDMI was also designed to carry what the industry refers to as "handshake" information from one device to another. These shared transmissions were originally intended to communicate copy protection data such as High-bandwidth Digital Content Protection (HDCP) to prevent piracy and transfer messages about what type of components were connected, as well as what their capabilities were.

In addition to the information noted above, the HDMI system was also designed to share more complex messages as a part of what is called Consumer Electronics Control (CEC). CEC potentially allows a single remote control to operate features on as many as 15 connected devices. There are nearly as many commercial names for CEC as there are electronics brands. For example, Samsung has called it "Anynet+," LG "SimpLink," and Sony "Bravia Sync."

One aspect of this disclosure addresses the problem of updating smart devices such as, by example only, sound bars 301 through their existing connection to the rest of the home entertainment system such as, again by example only, to a Smart TV 100. The most common interconnection between components of a home entertainment system is the HDMI cable 302 as mentioned above. Over its relatively brief history of twenty years, this cable has increased in its capacity and functional capability. The latest generation of the HDMI cable 302 can carry movie theatre quality video up to 8K resolution and movie theatre quality surround sound at recording studio quality sample rates such as Dolby Atmos, Dolby HD, and DTS:X. The combined data rates of the audio and video signals exceed 40 billion bits per second (Gbps.) The HDMI cable 302 also carries control information between entertainment center components to help reduce the number of remote controls needed when many devices are present such as Blu Ray disc players, game consoles, Internet set-top boxes, and the like. The HDMI cable 302 has become a practical multi-functional interconnect; greatly simplifying the installation and use of advanced home entertainment devices.

The HDMI cable 302 can provide almost any data transfer role of conveying audio, video, information, and control signals except for conveying firmware modules reliably and accurately from one component to another for the purpose of updating the firmware of a particular consumer electronic product, such as a soundbar. Therefore, this disclosure describes methods and systems in which channels of an HDMI ARC cable are repurposed to reliably carry complex computer firmware. Further disclosed is a system and method for accomplishing this goal without interfering with the normal operation of a home entertainment system and, more importantly, without the consumer being required to perform any complex steps or operations to achieve a reliable update of firmware on the targeted device.

The process of updating peripheral devices such as sound bars utilizes the HDMI ARC connection between the TV 100 and the sound bar. This data connection was designed for digital audio signals and is based on the SPDIF protocol (IEC-10958), a well-known consumer electronics digital communications protocol. The SPDIF protocol can accommodate up to 12.28 Mbps data transfer rate which is more than sufficient for the utilizing it for repurposing of the HDMI ARC channel for data transfer of a firmware update to an attached device. As the ARC channel is a data path for audio from the TV to be conveyed to an attached speaker system, whether a single sound bar or a home theater surround sound system, in one embodiment of the disclosure a mode switching sub-system temporarily blocks the transfer of digital audio and substitutes the transfer of digital firmware data during the firmware updating process of the sound bar. Upon completion of the data transfer, the digital audio connection is restored. In another embodiment, the data for firmware updates is multiplexed with the digital audio data for transfer to the audio subsystem without interrupting the audio program material. The data exchange rate is the inverse of the digital audio requirement of the ARC connection. For example, with the eARC protocol, the maximum bandwidth available to the audio data is 36.86 billion bits per second (Gbps) which can accommodate eight channels of surround sound audio at 192,000 samples per second. Very few feature films are sold to the consumer at these extreme parameters. Most Blu-ray or streaming feature films will utilize only a fraction of that bandwidth. For example, the popular Dolby Atmos surround sound protocol utilizes about 18 million bits per second (Mbps) for its best sound quality setting. There is considerable bandwidth remaining to interleave secondary data of the firmware update process without interfering with program audio. In the case of the lower bandwidth ARC channel, the average television program would utilize approximately 1.54 Mbps for a typical stereo audio program leaving sufficient remaining bandwidth for an interleaved data path for firmware updates.

Figure 9:
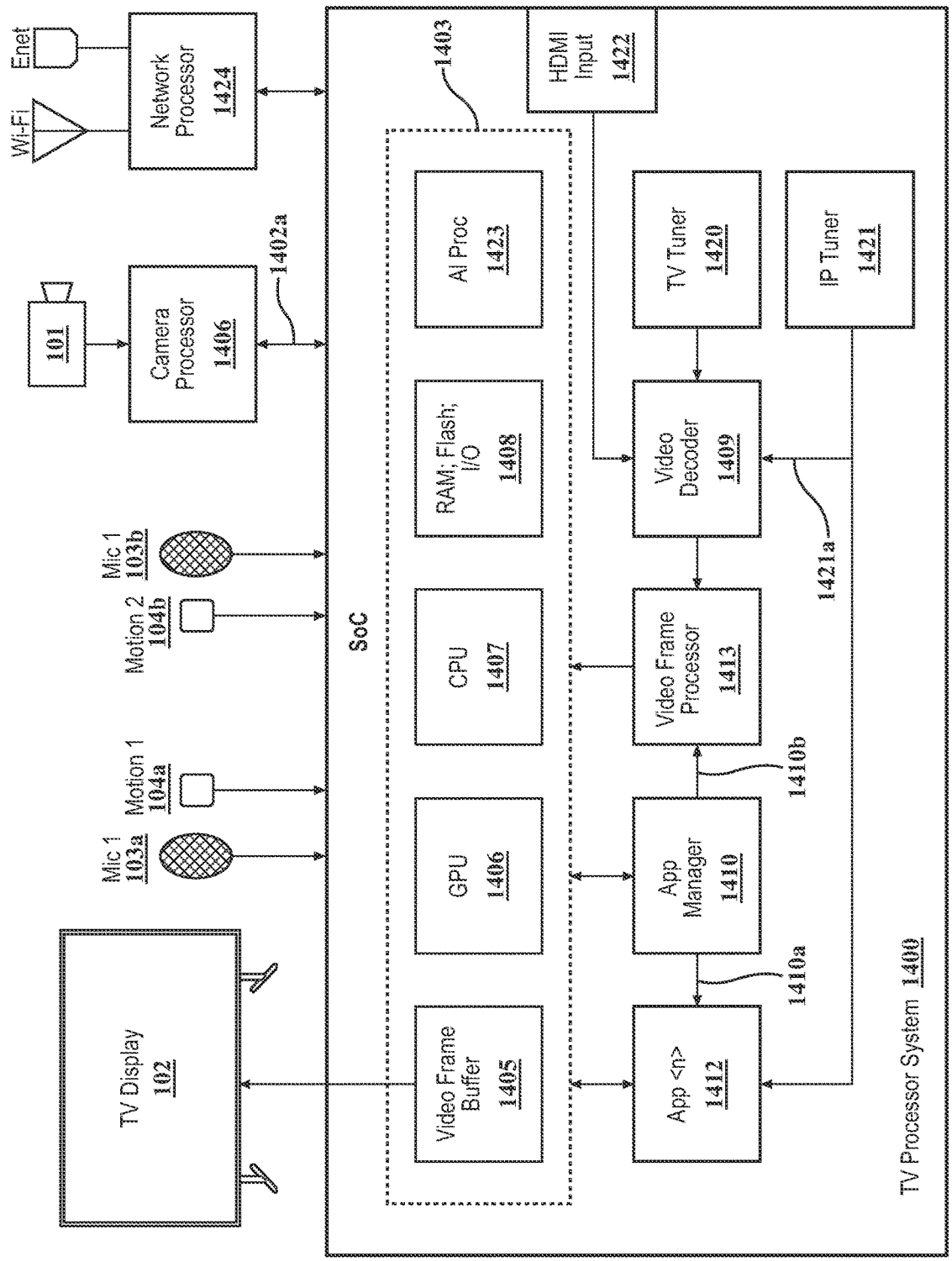
FIG. 9 is a block diagram of the processing system of a smart TV.

The processing system supporting the functionality of the smart TV system as disclosed herein, is summarized in FIG. 9. The TV Processing System 1400 is shown in a block diagram in FIG. 11 wherein television signals are received either from a set-top box via HDMI 1422 or by a TV Tuner 1420 or Internet Protocol video is received by an IP Tuner 1421 via Network Processor 1424 connected to a LAN via Wi-Fi or Ethernet. Additional information regarding the environment directly in front of the TV 100 is collected by one or more video camera systems 101 integrated into or otherwise operatively connected to TV 100. In FIG. 9 the system of the disclosure shows a block diagram providing the necessary functions of image reception, image manipulation (scaling, stitching, transforms, etc.), and firmware application (app) execution. The embodiment depicted in FIG. 9 is representative of a smart TV system. It is provided for example only and is not intended to restrict the disclosure to this diagram.

The one or more video cameras 101 in combination with the camera processor 1406 operatively connected to the smart TV system provide digital picture information to the processing system 1400 where the processing system is typically implemented as a system-on-a-chip (SOC) 1403 consisting of a CPU 1407, a Graphical Processing Unit (GPU) 1406, RAM and permanent (e.g., flash memory) storage 1408, a video frame buffer 1405, a specialized AI processor 1423 and other necessary elements for use in a processor system of a smart TV. The camera information 1402a (video stream) of the disclosure may be processed by the Video Frame Processor 1413 under the control of App Manager 1410 running in the memory of the SOC 1403 which processes the incoming camera video stream to act on the video information under the control of the application running in TV App <n> 1412.

The TV App <n> 1412 may also be executing a video calling or conferencing application or executing an entertainment application such as a video "watch party" or otherwise processing video both incoming from the other end or ends of a video conference call as well as providing the network streaming to send the processed video of the Camera Processor 1406 through the Internet to the other parties of a multi-way video application. The App Manager 1410 may assist one or more TV Apps <n> 1412 in processing the video broadcasts received by the TV Tuner 1420 or the HDMI Input 1422 received from a set-top box, or video received over the Internet by IP Network Interface 1421.

In all examples, the App Manager 1410 does, among other things, the processing of the composite video output of any TV Apps <n> 1412 that are currently active in memory so that the composite video picture involving local and remote video sources and whatever other elements such as graphic overlays generated by TV Apps <n> 1412 are scaled and positioned appropriate to the executing application or service.

The system of FIG. 9 identifies and track actions of users in front of the TV in real-time and in the background without the need for a user to request the service or even be aware of its presence, though the identification system can, of course, be disabled for any or all persons of a household.

As indicated above, in one embodiment, audio data transfer from Smart TV 100 to soundbar 301 is temporarily paused while the firmware data transfer to soundbar 301 is talking place. In certain examples, the firmware data transfer is initiated after a prolonged, specified period during which no audio is transmitted to the soundbar 301. If any audio is transmitted to the soundbar 301 during firmware updating, it is essentially dropped and is not played.

Figure 11:
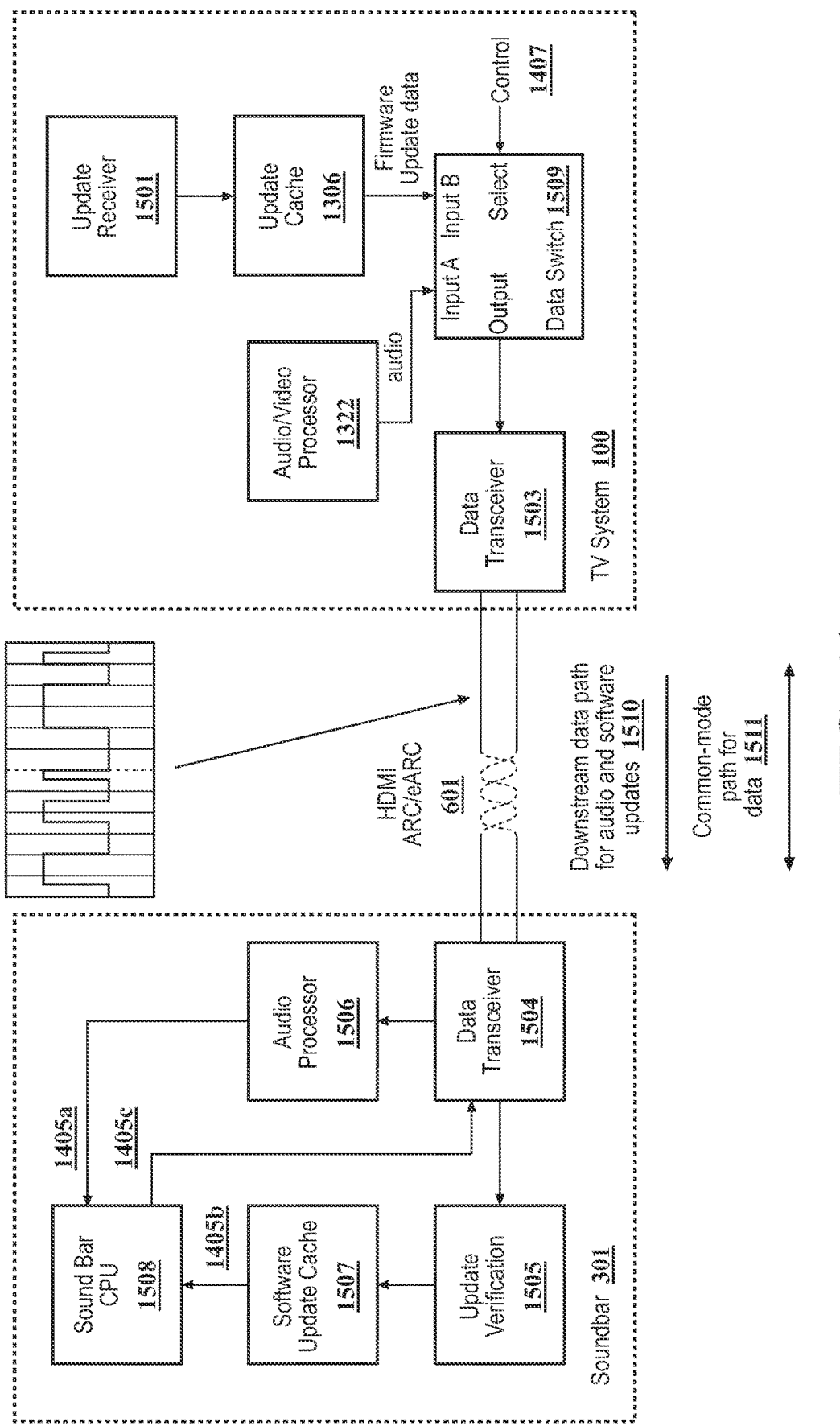
FIG. 11 is a block diagram of a system for transmitting either audio or firmware data from the Smart TV of FIG. 1 to an audio device via the audio return channel of an HDMI ARC cable.

The transfer and programming of a remote processing device, such as the core of a modern sound bar, requires two-way communications. Referring to FIG. 11, firmware updating data travels downstream from Smart TV 100 via downstream data path 1510 to the sound bar 301. Control information, including status of an update process, travels upstream back to the processor system 1400 (FIG. 9) of Smart TV 100 via common-mode data return path 1511 to record results and confirm (or not) the success of the update. The processor of the sound bar 1508 (FIG. 14) is in communication with the processor 1407 the Smart TV 100.

When time of day and other parameters indicate that no audio is passing to the sound bar 301, the soundbar processor 1508 signals the Smart TV 100 via communication path 1511 to inquire if an update is available. If an update is ready for installation, Smart TV 100 so notifies the soundbar 301 via control data transmitted on the common-mode path 1511. Smart TV CPU 1407 transmits a control signal to the select input of data switch 1509, which switches the data switch 1509 internal data path to input B to transmit firmware data from firmware update buffer 1306 to host transceiver 1503 to be conveyed to the soundbar and discontinue the transmission of audio data from audio/video processor 1322 by disabling input A of switch 1509.

When the soundbar 301 is notified that an update is available, soundbar processor 1508 switches off the inbound audio data information by disabling audio processor 1506 and enables the firmware update data path from update verification module 1505 and firmware update cache 1507 to begin the process of receiving the update firmware as an encrypted data module. Upon completion of the reception of the firmware updating data, the data is tested for data errors and then for authenticity. When received firmware updating data is validated, the soundbar processor 1508 determines an installation time either by sending via the return path 1511 a message to be displayed on the screen of TV 100 and waiting for a user response to proceed or not, or, in some embodiments, the updating process may be automatic where the process is programmed to apply updates only during early morning hours, such as between 2 am and 6 am, for example only. When a firmware update is received by the television system 100, the updating process executing by CPU 1407 first determines the time of day and, if between designated times, next monitors activity of audio data to the soundbar to determine if it is in use. If between the designated updating hours the soundbar is idle (not in use), the firmware update process will proceed without requiring the user's confirmation.

Figure 8:
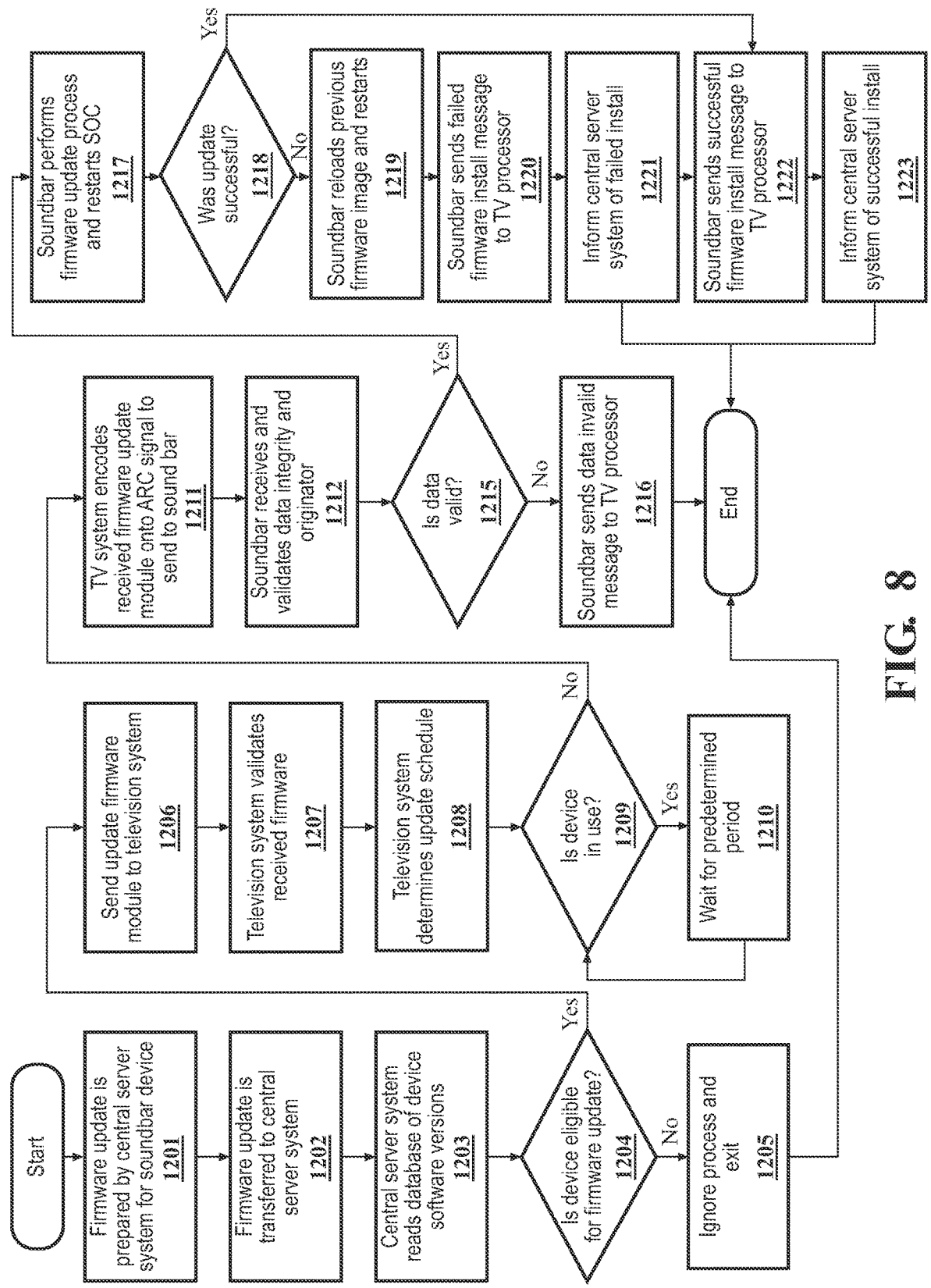
FIG. 8 is a flowchart depicting a method of updating the firmware in a soundbar connected to the Smart TV of FIG. 1.

An exemplary method of updating firmware in soundbar 301 will now be described with reference to FIG. 8. In the method of FIG. 8, the transfer of audio data from Smart TV 100 to soundbar 301 is paused while firmware update data is transferred from Smart TV 100 to soundbar 301.

Figure 10:
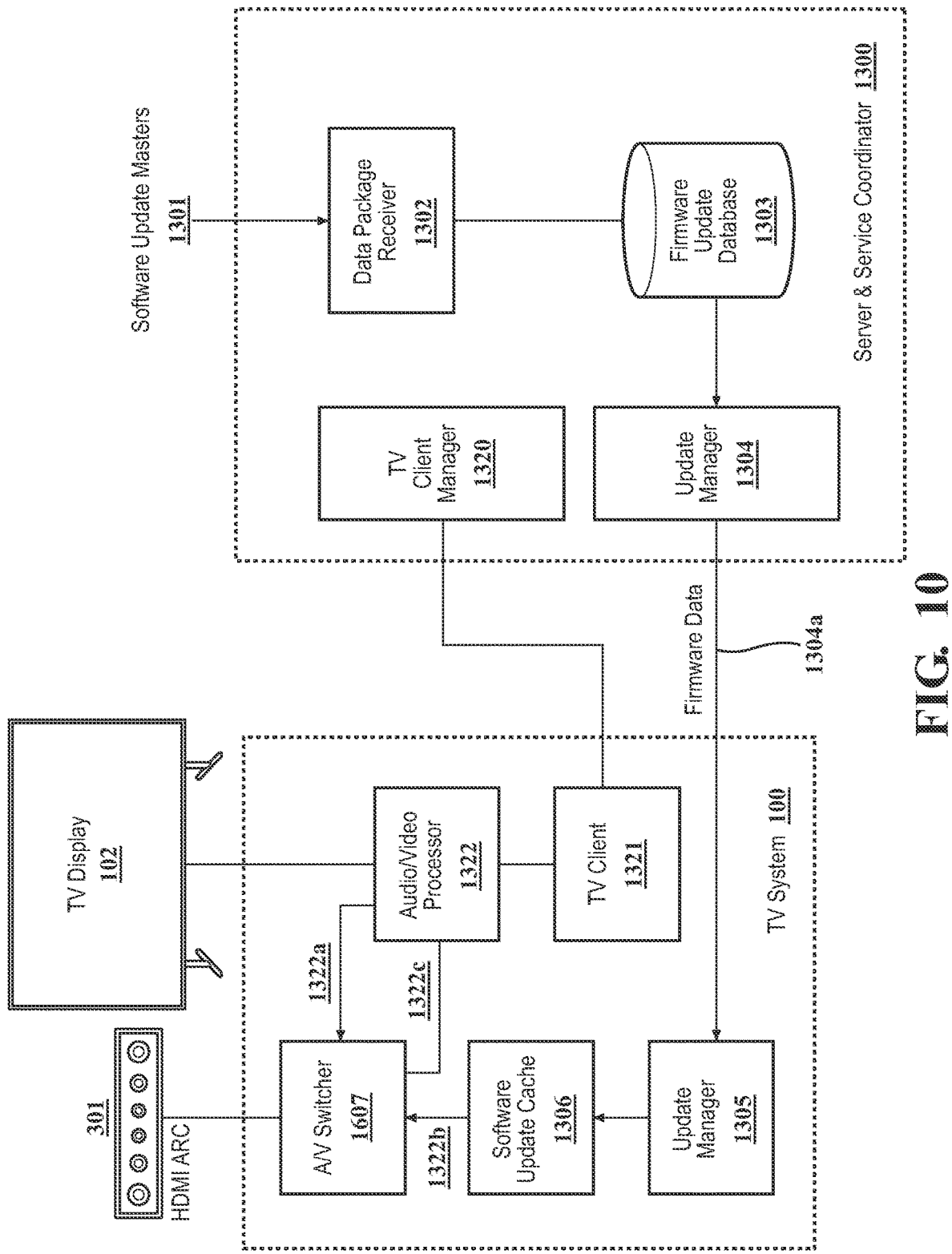
FIG. 10 is a block diagram of the internal processing components of the Smart TV of FIG. 1 connected to a source of audio device firmware updates.

In step 1201, a firmware update is prepared for a soundbar device 301. In step 1202 the firmware update is transferred to such as the server and service coordinator 1300 shown in FIG. 10. The central server system 1300 is a cloud-based server system supporting a national consumer brand, in one illustrative example. In step 1203 the central server system 1300 reads a database 1303 of device firmware versions where, in this example, the device is a soundbar 301 for smart TV 100. In step 1204, a test is made to determine if the soundbar 301 is eligible for a firmware update. If step 1204 returns a value of NO, the process is ignored in step 1205, and the method is exited. If step 1204 returns a valued of YES, the update manager 1304 sends the firmware update data to the firmware update data input 1304a (e.g., an ethernet connection or connection for Wi-Fi transmitted data) of Smart TV 100 in preparation for transferring the firmware update to the ARC-attached device (step 1206).

In step 1207, the Smart TV 100 validates the received firmware from the central server system 1300. The Smart TV 100 determines an update schedule for transferring the firmware to the HDMI ARC-attached soundbar 301. The update schedule is based on whether the soundbar 301 is in use in step 1209. If the soundbar 301 is in use (i.e., step 1209 returns a value of YES), the process waits for a predetermined period in step 1210 and control transfers back to step 1209. If the device is not in use (i.e., step 1209 returns a value of NO), in step 1211 the Smart TV encodes the received firmware update data received from firmware update data input 1304a into an ARC signal to send to the soundbar 301. The soundbar 301 receives and validates the data integrity of the firmware update data received by firmware update data input 1304a and validates the originator (the source of the update) in step 1212. If the firmware data is not valid when tested in step 1215, the soundbar sends a firmware data invalid message to TV processor in step 1216, and the process ends. If the firmware data is valid when tested in step 1215, the soundbar 301 performs the firmware update process and restarts the soundbar CPU 1508 (FIG. 14) in step 1217.

When the soundbar 301 restart with the new firmware is completed (step 1217), a test is made in 1218 to assess the success of the update. If the firmware update and restart process was successful in 1218, the soundbar 301 sends a successful firmware update installation message to TV SoC 1403 in step 1222, and in step 1223, a message is conveyed to the central server system 1300 of the successful installation of the firmware update which, in one embodiment, is then duly noted in a maintenance database. If the firmware update and restart process was not successful in step 1218, soundbar processor 1508 reloads the previous firmware image and restarts the system in step 1219. The next step in 1220 sends a failed firmware update installation message to TV processor in 1220, and in step 1221 a message is sent to the central server system 1300 of the failed install.

In an exemplary implementation of the method of FIG. 8, a non-transitory, computer readable medium operatively connected to Smart TV processor 1407 has computer executable instructions stored thereon, which, when executed by processor 1407 perform steps 1207 to 1211, and soundbar 301 has a non-transitory, computer readable medium operatively connected to soundbar processor 1508 with computer executable instructions stored thereon, which, when executed by processor 1508, performs steps 1212 to 1224. Also, server and service coordinator 1300 (FIG. 10) has a processor and a non-transitory computer readable medium with instructions stored thereon, which, when executed by its processor perform steps 1201 to 1206.

In other embodiments, the disclosed system utilizes the ARC channel of an HDMI ARC cable to simultaneously convey both audio and data over the ARC/eARC pathway without interruption to the audio data. These embodiments use a multiplexing process, which in certain examples, is a time-division multiplexing process in which the audio data and firmware data are transmitted in an alternating pattern in small time slices. The term "simultaneously" refers to the fact that audio data is continually played by soundbar 301 at its native rate without interruption to the user as the firmware update data is being transferred to soundbar 301. Thus, from the listener's perspective, the transfer of real-time audio data occurs simultaneously with the firmware updating data transfer. The system provides a multiplexer to combine digital audio of the ARC/eARC channel with data for firmware updates in the host device such as a smart TV and a corresponding demultiplexer in the sound bar to separate the audio data from the firmware update data thus providing a reliable means to deliver firmware modules for firmware updates while providing continuity for the program material being consumed by the viewer.

Figure 12A:
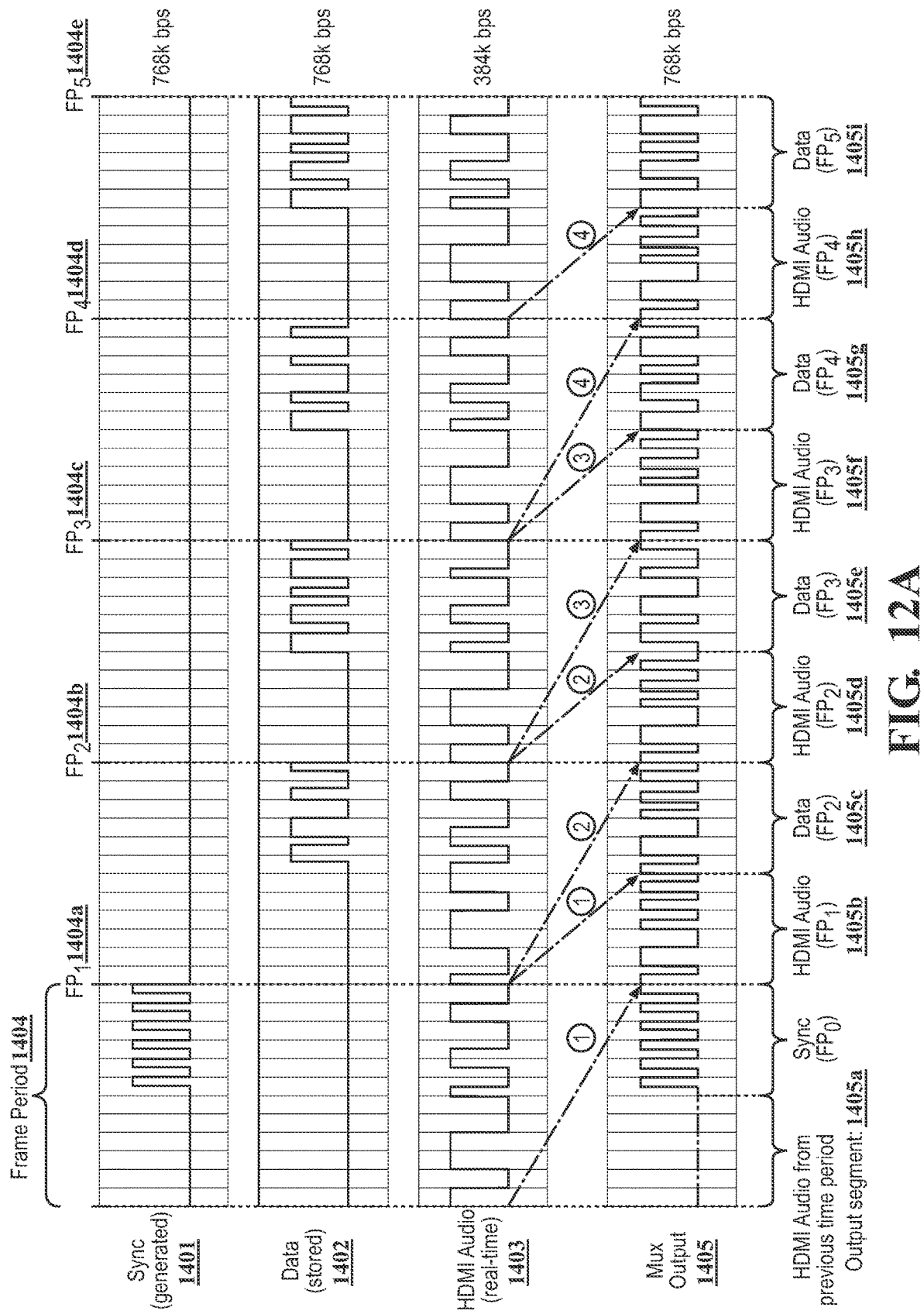
FIG. 12A is a data waveform diagram depicting the multiplexing of audio data and firmware updating data conveyed from the Smart TV of FIG. 1 to an audio device in which the audio data and firmware updating data are conveyed at twice their native rate in different portions of a clock cycle (frame period)
Figure 12B:
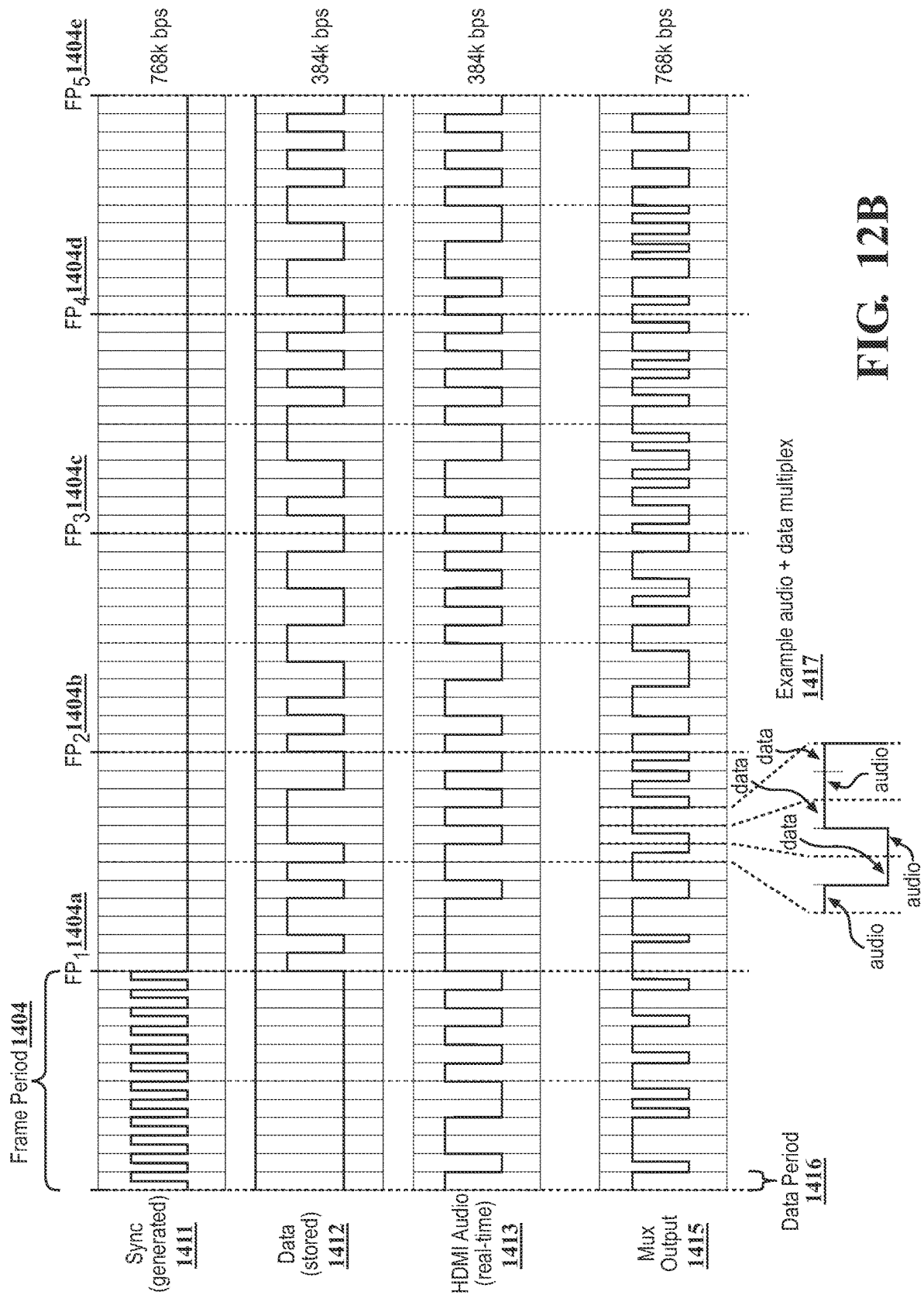
FIG. 12B is a data waveform diagram depicting the multiplexing of audio data and firmware updating data conveyed from the Smart TV of FIG. 1 to an audio device at the two data sources for simultaneously conveying both audio and data sources via ARC/eARC where each of the two data sources (audio data & firmware data) are conveyed at twice their native rate in different portions of a bit period within each clock cycle.
Figure 13:
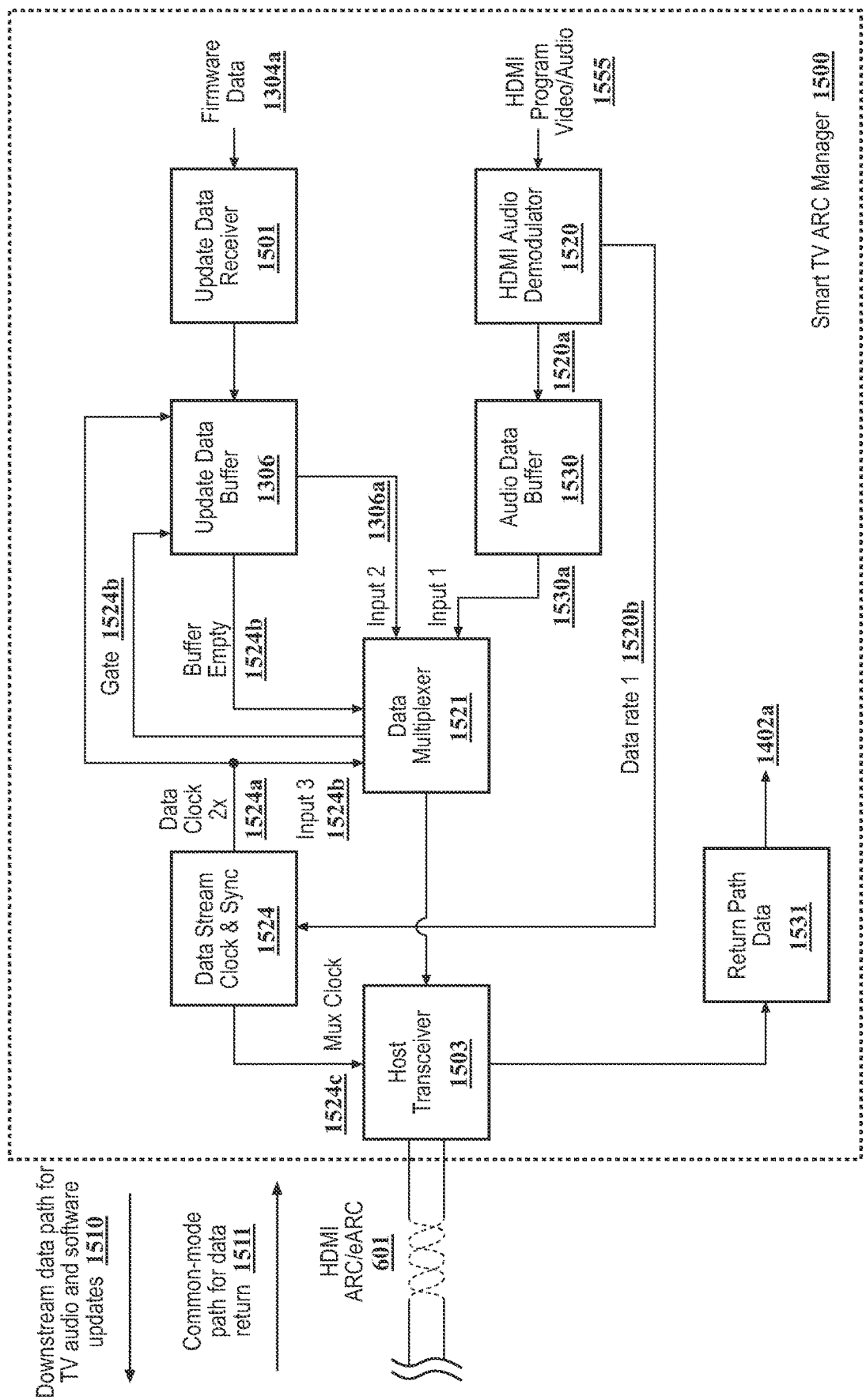
FIG. 13 is a block diagram of a subsystem of the Smart TV of FIG. 1 for updating the firmware of an audio device by simultaneously transmitting audio data and firmware update data.

FIG. 13 illustrates an example of a Smart TV ARC manager 1500 comprising processing modules for multiplexing firmware updating data and audio data transmitted to soundbar 301 via the audio return channel of an HDMI ARC cable. The waveform diagrams of FIGS. 12A-12B illustrate exemplary processes of multiplexing audio data and firmware updating data streams with accommodation for the isochronous nature of the audio data. That is, the audio data may be part of a television program currently being viewed and should not be interrupted or unevenly conveyed. Any interruption to the time-sensitive flow of the audio data would be immediately audible to the viewer and considered undesirable.

A method of providing a firmware update to soundbar 301 by multiplexing firmware data with audio data and transmitting it from a TV to an HDMI ARC-connected soundbar will now be described with reference to FIGS. 13 and 16. In this example, a central server system, such as server and service coordinator 1300 (FIG. 10), sends firmware update data to firmware update data input 1304a of Smart TV 100 (Step 1801). The Smart TV 100 validates the received firmware in step 1802 using, for example only, an MD5 process. Smart TV 100 measures the data rate of the ARC channel in step 1803. In step 1804 it is determined whether the HDMI ARC audio data rate is less that the maximum frequency minus 200 kbps. If the data rate is not less than the maximum frequency of the ARC channel minus 200 kbps (i.e., step 1804 returns a value of NO), in step 1805, the process waits until bandwidth is available for sending the firmware data on the ARC channel simultaneously with the audio data. If bandwidth is available (i.e., step 1804 returns a value of YES), then the ARC data rate 1520b is sent to send the audio data rate 1520b to data stream clock and synchronization module 1524 (FIG. 13) in step 1806. Data stream clock and synchronization module 1524 has an audio data rate signal input that is operatively connected to a data rate output of HDMI audio demodulator 1520 as well as a clock synchronization signal output 1524a that is connected to a corresponding input 1524b of multiplexer 1521. In step 1807, data stream clock and synchronization module 1524 generates a clock synchronization signal at output 1524a and supplies it to data multiplexer 1521. The clock synchronization signal from data stream clock and synchronization module output 1524a is also supplied to a corresponding input of the firmware update data buffer 1306.

In step 1808 the firmware update requested data rate is sent to multiplexer 1521. Audio from HDMI program video/audio source 1555 is demodulated by HDMI audio demodulator 1520 in step 1807 and buffered in audio data buffer 1530. Audio data buffer 1530 has an audio data signal input that receives data from demodulator 1520 and an audio data buffer signal output that is operatively connected to a first input 1530a of firmware and audio data multiplexer 1521. The demodulated and buffered audio data is sent to first input 1530a of data multiplexer 1521 in step 1810.

Firmware update data is received from firmware update data input 1304a (e.g., an ethernet or Wi-Fi internet connection) which is itself an input to update data receiver 1501. Firmware update data is buffered in firmware update data buffer 1306, which has an input that receives data from firmware update data receiver 1501 and an output that is operatively connected to a second input 1306a of firmware data and audio data multiplexer 1521.

The multiplexer 1521 has an output that is operatively connected to a soundbar audio input via the audio return channel of HDMI ARC cable 601. Multiplexer 1521 combines audio data, firmware update data, and clock synchronization signal (from output 1524a) in step 1811 and transmits it via an output connected to host transceiver 1503.

Host transceiver 1503 has an output connected to the audio return channel of HDMI ARC cable 601 and respective inputs connected to a multiplexer clock signal output 1524c of data stream clock and synchronization module and multiplexer 1521. Next, the host transceiver 1503 modulates multiplexed data from data multiplexer 1521 onto a bi-phase mark encoded signal compatible with ARC in step 1812 using a multiplexer clock signal transmitted from multiplexer clock signal output 1524c of data stream clock and synchronization module 1524. The multiplexed data is then transmitted over HDMI ARC cable 601 to soundbar 301 in step 1813.

Figure 14:
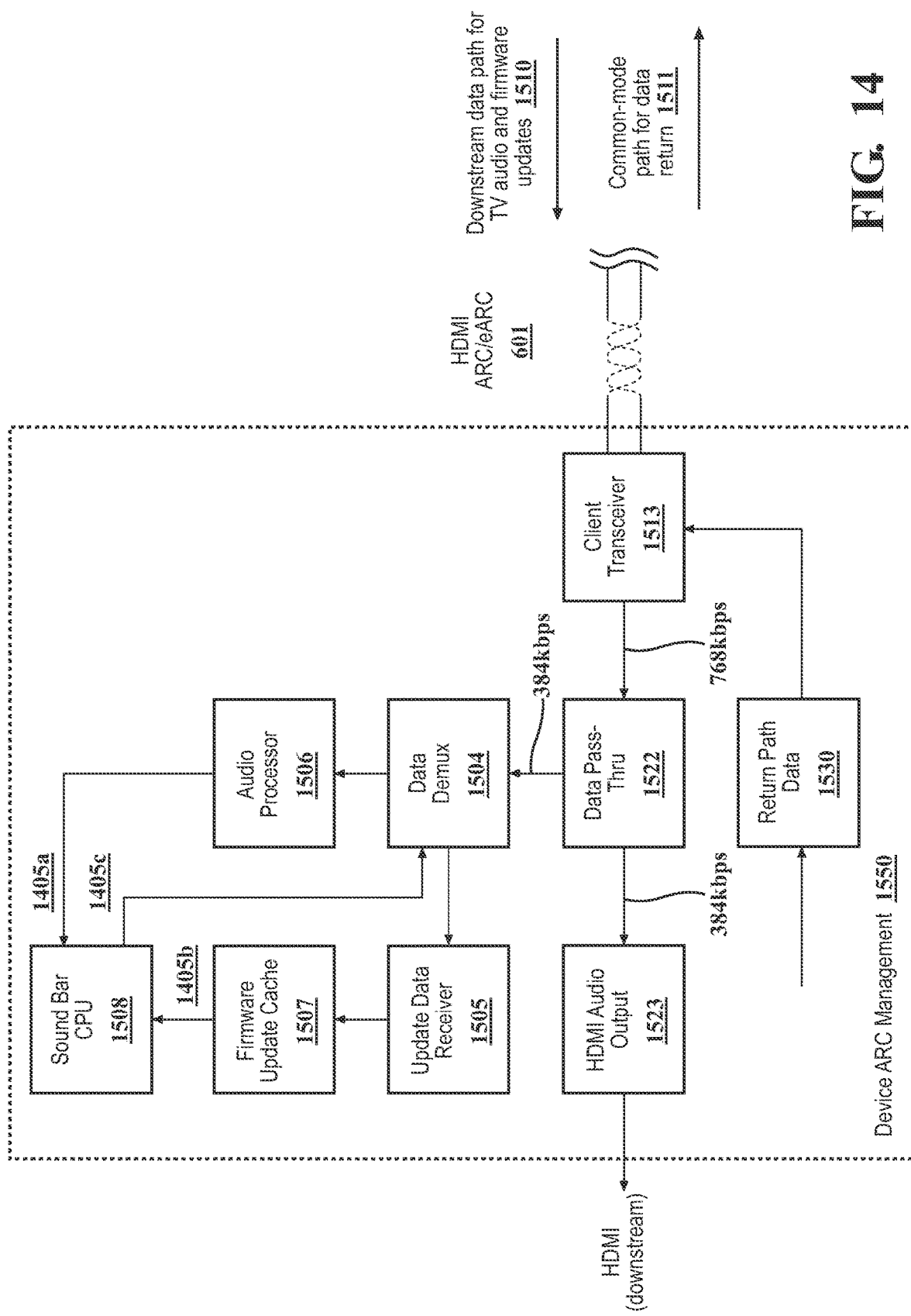
FIG. 14 is a block diagram of subsystem of an audio device for demultiplexing the multiplexed audio data and firmware data provided by the Smart TV subsystem of FIG. 13 via an HDMI ARC cable.

Referring to FIG. 14, data demultiplexer 1504 of soundbar 301 demultiplexes received multiplexed data and separates the data into audio and firmware data streams in step 1814. The audio data is processed by audio processor 1506, and the resulting processed audio data stream 1405a is sent to the soundbar processor 1508 to be played. The firmware data is sent to update data receiver 1505 and then to software update cache 1507, where it is stored. The stored firmware data is sent to the soundbar processor 1508 to execute the updating process. In step 1813 HDMI ARC audio also passes through the system in data pass thru 1522 as an unmodified signal in while delivering firmware update data to soundbar 301.

Figure 16:
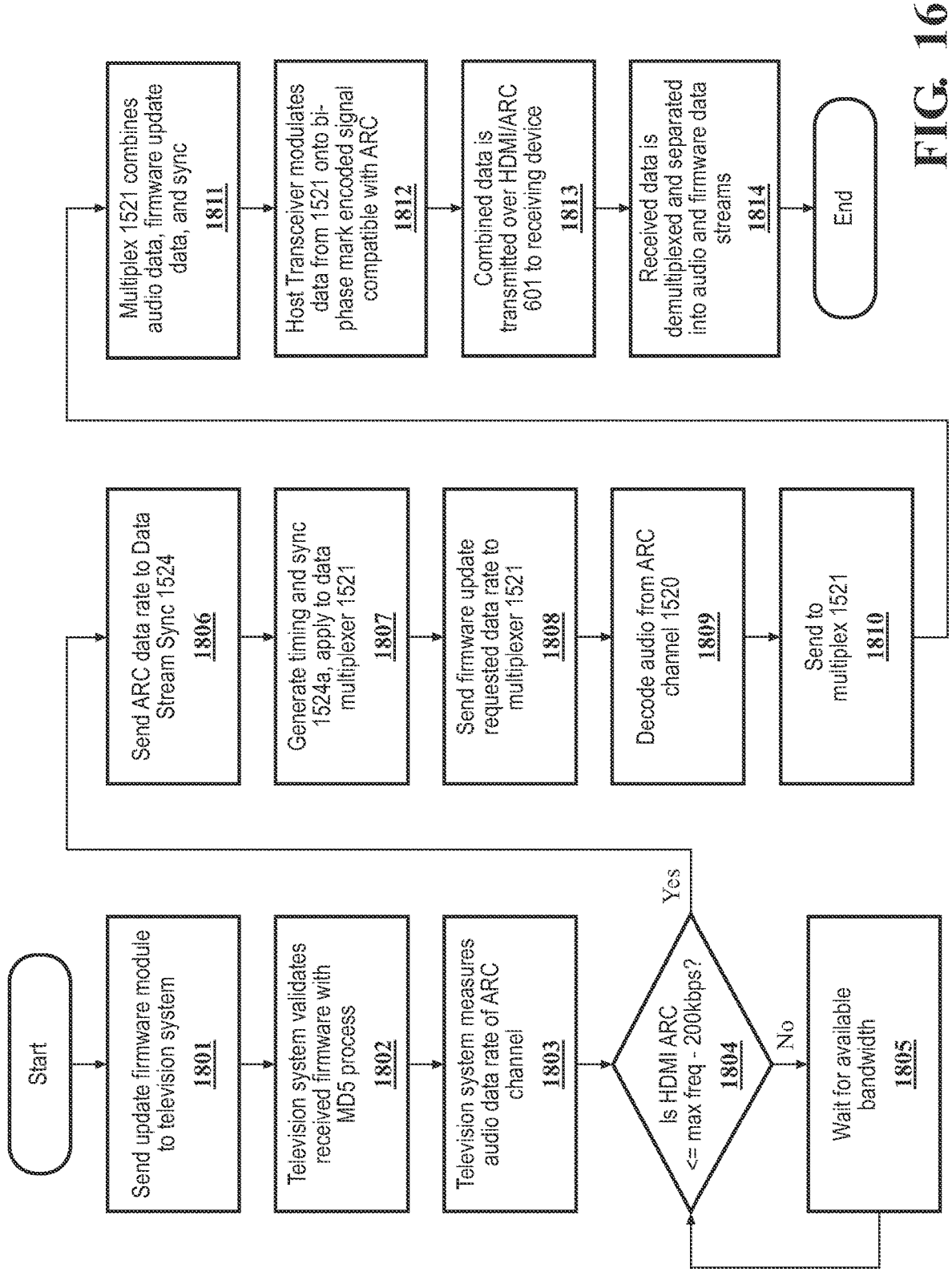
FIG. 16 is a flowchart depicting a method of simultaneously transmitting audio data and firmware data from the Smart TV of FIG. 1 to an audio device by allocating available data bandwidth of an HDMI ARC/eARC channel.

In an exemplary implementation of the method of FIG. 16, a non-transitory, computer readable medium operatively connected to Smart TV processor 1407 has computer executable instructions stored thereon, which, when executed by processor 1407 perform steps 1802 to 1813, and soundbar 301 has a non-transitory, computer readable medium operatively connected to soundbar processor 1508 with computer executable instructions stored thereon, which, when executed by processor 1508, performs step 1814. Also, server and service coordinator 1300 (FIG. 10) has a processor and a non-transitory computer readable medium with instructions stored thereon, which, when executed by its processor perform step 1801.

Exemplary methods for multiplexing audio data and firmware update data will now be described with reference to FIGS. 12A and 12B. In each example, firmware and audio data multiplexer 1521 receives a control signal from TV processor 1407 which indicates which input 1306a (firmware update data) or 1530a (buffered audio data) is to be operatively connected to the multiplexer output for transmission to host transceiver 1503. The control signal has a specified switching frequency and is generated by executing a program stored on a computer readable medium in Smart TV 100 which is based on carries out whichever multiplexing algorithm is used. Two such exemplary algorithms are illustrated in FIGS. 12A and 12B.

In FIG. 12A the firmware updating data 1402 is multiplexed with HDMI Audio data 1403 to produce the multiplexed (Mux) output 1405 data stream. In the example of FIG. 12A, the data transmission rate of firmware updating data 1402 from the Smart TV 100 to the soundbar 301 is set to be twice the native transmission rate of audio data 1403 (i.e., the transmission rate of the audio data from HDMI program video/audio source 1555) but is transmitted in only one-half of any Frame Period 1404 to simplify clocking and synchronization, which is consistent with most current multiplexing systems. The maximum data rate of ARC is 2 million bits per second (bps) and eARC maximum is 48 million bps. In an equal-data-rate scenario, the transmission rate of firmware updating data 1402 can only equal the transfer rate of audio data 1403 up to one-half of the channel maximum. Above one-half of the channel maximum, the firmware data 1402 transmission rate must be equal to the maximum channel data rate minus the current HDMI Audio 1403 data rate. If the transmission rate of audio data 1403 is equal to the maximum channel rate, then the firmware updating data 1402 multiplexing operation must cease until a usable channel capacity returns.

In this embodiment, data multiplexing proceeds in Frame Period (FP) 1404 steps through the data. The first block 1405a of data consists of a synchronization signal 1401 which is transmitted at the Mux Output 1405 data rate, which in this example the 2× data rate of 768 kbps. The audio data 1403 is received at 384 kbp, buffered for a Frame Period 1404 and then clocked through the multiplexer 1521 at twice its native data rate (768 kbps) during the first half of a Frame Period 1404.

The firmware updating data 1402 is set to be clocked out at an average of 384 kbps per frame from the firmware update data buffer 1306 but in half-frame bursts of 768 kbps and occupying the second half of the Frame Period 1404. The combined channel data rate for the Mux Output signal 1405 is therefore 768 kbps where the average bits per second of audio remains at its received rate of 384 kbps and the firmware update data is conveyed at an average of 384 kbps. Unlike the audio data, the firmware update data is not received as a stream of real time data, so it has no original frame period associated with it. All of the firmware updating data 1402 for a given update is stored in the firmware update data buffer 1306 and then transmitted to the data multiplexer 1521 at the same time it is output by the data multiplexer 1521. Thus, the $FP_x$ frame period designations for firmware updating data 1402 in the various output segments 1405c, 1405e, 1405g, an 1405i are the same as the frame period during which the firmware updating data 1402 is transmitted from data multiplexer 1521 to host transceiver 1503, whereas for audio data the FPx frame period designations in output segments 1405b, 1405d, 1405f, and 1405h are offset by one from the frame periods of the native audio signal 1403.

The multiplexing process begins with a frame period $FP_0$ of the synchronization signal 1401 (which is not cached) as illustrated in FIG. 12A, resulting in the synchronization signal appearing in output segment 1405a during the second half of frame period $FP_1$ 1404a. During this sync period in output segment 1405a (which equals one-half of the total frame period $FP_1$ 1404a), the received audio data signal 1403 from frame period $FP_1$ is cached in Audio Data Buffer 1530 (FIG. 13). At the start of the next output segment 1405b (which is during the first half of frame period FP2), the audio data from frame period $FP_1$ in buffer 1530 is clocked through the data multiplexer 1521 at twice the original audio data rate, which in the example of FIG. 12A is 768 kbps. This data is transmitted through host transceiver 1503 to the audio return channel of HDMI ARC cable 601 with the data clock signal from data clock and synchronization module output 1524c, which is operating at 768 kbps and embedded in the data per the data protocol S/PDIF as used by the ARC/eARC channel.

The buffered audio data transmitted in output segment 1405b is followed by the transmission of the first block of firmware updating data 1402 in output segment 1405c which occurs during the second half of frame period $FP_2$. The arrows in FIG. 12A are numbered to indicate that they correspond to the beginning and end points of the same frame period. For example, the arrows numbered "2" show the that the audio data transmitted in output segment 1405d during the first half of frame period $FP_3$ was received by the audio data buffer 1530 during frame period $FP_2$.

Upon completion of output segment 1405c, a second frame of audio that was collected in the buffer 1530 during frame period $FP_2$ is next clocked out output segment 1405d during the first half of frame period $FP_3$. At the conclusion of sending audio data 1403 in output segment 1405d, the next frame of firmware update data 1402 is now transmitted, during output segment 1405e in the second half of frame period frame period $FP_3$. As indicated earlier, the firmware update data 1402 is neither isochronous nor time-sensitive and, unlike the audio data 1402, it can be transmitted to the client device (e.g., soundbar 301) at any available data rate and with any arbitrary time delay or time offset. At the end of output segment 1405e, another frame of audio data 1403 received by audio data buffer 1530 during frame period $FP_3$ is ready to be sent during output segment 1405f during the first half of frame period $FP_4$. The audio 1403 data, which is received via HDMI source 1555 at a native transmission rate of 384 kbps, is output at host transceiver 1503 at 768 kbps, followed again by a frame of firmware update data 1402 during firmware data during output segment 1405g.

In summary, in the example of FIG. 12A, the real-time audio data is buffered for one frame period then sent to the client device (e.g., soundbar 301) in the first half of the next frame period, while firmware update data 1402, occupies the second half of the frame period. The process is repeated until the entire set of firmware update data 1402 is sent. Upon completion of sending the firmware updating data 1402, the system discontinues the multiplexing process and audio data from HDMI program audio source 1555 simply passes unchanged through the data multiplexer 1521 onto the ARC/eARC channel.

Referring again to FIG. 13, the multiplexed data of television audio, firmware data, and sync information is modulated by host transceiver 1503 using the bi-phase mark encoded protocol as used by the HDMI ARC pathway. This data transmission protocol is an industry standard known as the Sony/Philips Data Interconnect Format (S/PDIF) and widely used in consumer electronics devices. The S/PDIF data transmission format is compatible with the HDMI ARC/eARC subsystem. The maximum audio data rate over an eARC channel is 48 Mbps for 10 channel surround sound at full studio resolution of 192 k/24b. However, almost all television programming is provided as AAC-encoded stereo at 384 kbps to 1.5 Mbps. Data for firmware updates (or any other purpose) may occupy any unused bits below 48 Mbps, in the case of eARC and below 2 Mbps in the case of ARC which for most of the typical television viewing day provides ample bandwidth for simultaneously conveying data with the audio without constraining the ARC or eARC data channel. In one embodiment, the audio data rate signal 1520b is detected by the HDMI audio demodulator 1520 and conveyed to the data multiplexer 1521. In this example, the audio arrives at the television standard data rate of the AAC protocol of 384 kilobits per second. For simplicity, as the data rate is far below the maximum channel bandwidth of either ARC or eARC, the data rate for the multiplexed output data is double the rate at which audio data is received by the data multiplexer 1521. The multiplex data clock signal is derived by the data stream clock & sync 1524 process from the data rate 1 clock signal 1520b. Thus, the incoming audio data rate determines the multiplex system timing. In this example, the audio is presumed to be received from HDMI program audio/video source 1555 at a rate of 384 kbps and the data stream clock & sync function doubles that rate to 768 kbps for both data clocking and data clock encoding. The data clock encoding, via a mux clock signal transmitted from output 1524c of data clock and synchronization module 1524, is the bi-phase mark encoded protocol native to the ARC/eARC format. The data clock is imposed on the multiplexed data stream of audio, firmware, and sync data to create the S/PDIF-like format output transmitted from host transceiver 1503 to the client device (e.g., soundbar 301).

The combined data as transmitted by the Host Transceiver 1503 contains a synchronization data pattern provided by data stream clock and synchronization module 1524 which is applied to the multiplexed data stream by gating on Frame Period 1404 of Data Clock 2× through the Data Multiplexer on Input 3 1524*b*. In this example, a single frame period is used to transmit a synchronization signal at the operating data rate of the multiplexer which is twice the HDMI audio data rate.

The data stream clock & sync 1524 data is used to convey timing information necessary to synchronize to and demodulate the composite stream transmitted on downstream data path 1510 and separate its components back into the original constituent streams of TV audio and firmware update data. By utilizing a simple clock rate of two times the audio clock rate, a low-cost multiplexer/de-multiplexer can be constructed for providing a means to combine audio data with firmware data and separate the data on the receiving device, such as soundbar 301. Specifically, HDMI audio data from the HDMI source is demodulated by HDMI audio demodulator 1520 into a raw audio bit stream 1520*a* and multiplexed with the synchronization clock signal transmitted at output 1524*a* and firmware updating data stored in firmware update data buffer 1306 for firmware updates. The data channel is not time sensitive (not isochronous) and can be stopped and started arbitrarily to accommodate the periodic sync signal as well as the isochronous audio data. The synchronization clock signal 1524*a* is utilized by the system to enable the client device, such as soundbar 301, to synchronize with the host system, such as Smart TV 100, to decode the multiplexed data stream and extract both the firmware data (when present) and the isochronous audio data without any interruption to the audio data which would otherwise cause an audible (and unacceptable to the viewer) interruption to the audio program material. The combined data is then encoded using the same data encoding scheme as the ARC channel (bi-phase mark) but at twice the clock rate, in this example 786 kHz.

Referring again to FIG. 14, in the examples of FIGS. 12A and 12B (described below), an audio device ARC Management System 1550 is provided for updating firmware in an audio device such as soundbar 301. In FIG. 14 data demultiplexer 1504 separates HDMI audio data at 768 k bps and firmware data at 768 kbps, respectively, from the 768 kbps composite data signal received by client transceiver 1513 via the audio return channel of HDMI ARC cable 601. The periodic sync signal and firmware data are discarded by the demultiplex process of Data Pass-Thru 1522. The skilled person would know that any ratio of audio data to firmware data can be obtained if a synchronization signal such as sync signal 1524 is present to provide a reference to separate the two data streams. In this embodiment, the only requirement is for the sum of all data sharing the ARC or eARC channel to be below the maximum allowed for the channel where the maximum for ARC is 2 Mbps and eARC is 48 Mbps.

The client transceiver 1513 receives the multiplexed data stream from host transceiver 1503 and conveys the data stream to data demultiplexer 1504. Data demultiplexer 1504 detects the synchronization clock signal from data clock and synchronization module 1524 which is embedded in the data stream then decodes the audio data stream and re-clocks the audio data back to its original 384 kbps data rate as used in this example. The recovered audio data is applied to the audio processor 1506 to be decoded and sent then to the soundbar processor 1508 associated with the video programming being consumed. When firmware update data is received, it is applied to update data receiver 1505. The received firmware update data is then validated, typically utilizing the MD5 hash protocol, to detect any data errors and, assuming no errors, is applied to firmware update cache 1507 to be applied to soundbar processor 1508 when a firmware update is scheduled.

Figure 15:
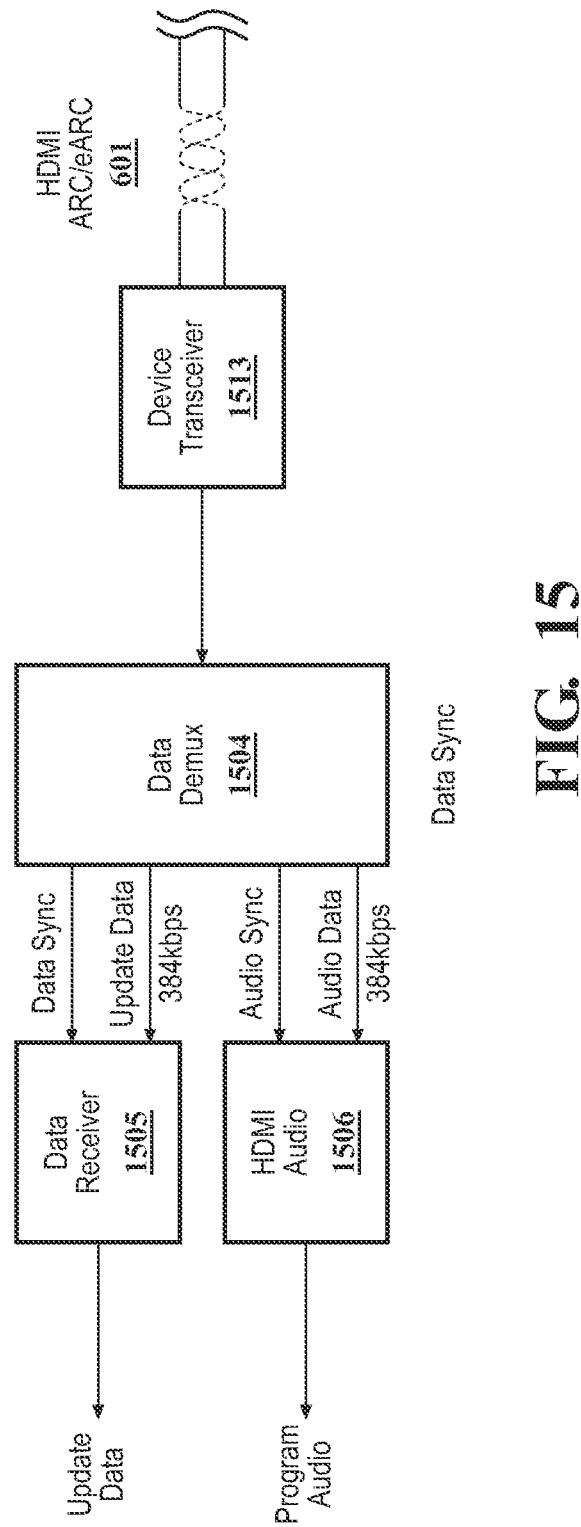
FIG. 15 is a detailed block diagram of the demultiplexing subsystem of an audio device connected to the Smart TV of FIG. 1 via an HDMI ARC cable.

The complete signal path for demultiplexing the ARC/eARC signal can be seen in FIG. 15 which shows the data synchronization logic for both the firmware data and isochronous HDMI audio data.

Another embodiment of a multiplexing scheme for sending both audio data and firmware updating data over the ARC/eARC channel simultaneously will now be described with reference to the waveform diagram of FIG. 12B. In the example of FIG. 12B, the data rate of the audio data is doubled, and the first half of each data period (or "bit period") 1416 contains audio data and the second half of the data period 1416 contains whatever firmware updating data is to be sent to the client device. The bit period is fixed by and is the inverse of the audio data rate. It can be seen in the audio+data multiplex 1417 that audio data is represented in each first half of the data period 1416 and firmware updating data 1412 occupies the second half of the data period 1416.

Referring again to FIG. 14, data demultiplexer 1504 is operatively connected to an audio input of the soundbar 301 via client transceiver 1513. Data demultiplexer 1504 has a first output connected to audio processor 1506, and a second output connected to firmware update receiver 1505. Data demultiplexer 1504 also has a control signal input (not shown). The state of the control signal dictates whether data received from data pass thru 1522 is treated as audio data and sent to audio processor 1506 or treated as firmware update data and sent to firmware update receiver 1505. A program resident on a computer readable medium operatively connected to soundbar processor 1508 is executed by soundbar processor 1508 and generates the control signal. The frequency and timing of the control signal state changes are dictated by the multiplexing method that is used and the synchronization signal 1401 or 1411 received with the multiplexed data at the client transceiver 1513. Thus, when a multiplexing method such as the one depicted in the example of FIG. 12A is used, the control signal changes state every half frame so that the data demultiplexer 1504 decodes the first half of each frame period 1404 and sends that audio data on to the audio processor 1506, which will process the audio data like a direct ARC/eARC transmission and so that data demultiplexer 1504 decodes the second half of each frame period 1504 and sends that data to firmware update receiver 1505. In the example of FIG. 12B, the control signal changes state every half data (bit) period. In the example of FIG. 12B, the de-multiplexing process that is used to generate the data demultiplexer input control signal always decodes the first half of each data period 1416 via data demultiplexer 1504 and sends that audio data on to the audio processor 1506. Meanwhile, the data demultiplexer 1504 will analyze the firmware data half of the multiplexed data signal and watch for the sync signal 1411 (FIG. 12B) which will consist of all one's for the frame period 1404 which, in this embodiment consists of 12 data periods 1416. Upon detection of data sync, the data demultiplexer 1504 will route the second half of the data period 1416 to the firmware update data receiver 1505 which will receive the data and test the data for validity then transfer the data to the firmware update cache 1507 to await the updating of the firmware of the client device.

This disclosure has shown a system that can mix time-sensitive (isochronous) data with time-insensitive data for any purpose where in this disclosure the data is, for example purposes only, used for firmware updates. A synchronization scheme has been illustrated that advantageously exploits a bi-phase embedded clock scenario allowing two data streams plus a sync signal to be combined by simply doubling the data rate of the most time sensitive element being the HDMI Audio data without any time interruption to the isochronous data element. This multiplexing scheme can be used without the need to enable or disable its function such that firmware or other data can be received at any time and sent to a client device without requiring a special session controller that stops audio data to enable update data only to re-enable audio data when the update data has been conveyed. The end user perceives no interruption.

What is claimed is:

1. A television configured to update the firmware in a connected audio device, comprising:
   an audio data buffer having an audio data signal input and an audio data buffer signal output;
   a firmware update data buffer having a firmware update data buffer signal input and a firmware update data buffer signal output;
   a firmware data and audio data multiplexer having a first input operatively connected to the audio data buffer signal output, a second input operatively connected to the firmware update data buffer signal output, and an output operatively connected to the audio device input via an audio return channel of a High-Definition Multimedia Interface Audio Return Channel (HDMI ARC) cable; and
   a data stream clock and synchronization module, wherein the data stream clock and synchronization module has an audio data rate signal input and a clock signal output, wherein the clock signal output is connected to a clock signal input of the firmware data and audio data multiplexer.

2. The television of claim 1, wherein the data stream clock and synchronization module clock signal output is operatively connected to an audio input of the audio device via the audio return channel of an HDMI ARC cable.

3. The television of claim 1, wherein the firmware update data buffer comprises a clock signal input, and the data stream clock and synchronization module clock signal output is connected to the firmware update data buffer clock signal input.

4. The television of claim 1, further comprising a host transceiver having an output connected to the HDMI ARC cable audio return channel, a multiplexer clock signal input connected to the data stream clock and synchronization module multiplexer clock signal output, and a multiplexed signal input connected to the firmware data and audio data multiplexer.

5. The television of claim 1, wherein the multiplexer is configured to receive audio data at a first data rate and transmit multiplexed data at a multiple of the first data rate.

6. The television of claim 5, wherein the multiplexer is configured to transmit audio data received at the first input and at the first data rate to an audio input of the audio device in a first portion of data frames having a frame period at the multiple of the first data rate.

7. The television of claim 6, wherein the multiplexer is configured to transmit firmware update data received at the second input and at the first data rate to the audio input of the audio device in a second portion of the data frames having the frame period at the multiple of the first data rate.

8. The television of claim 6, wherein the multiplexer is configured to transmit audio data received at the first input and at the first data rate to the audio device input in a first portion of a bit period at the multiple of the first data rate.

9. The television of claim 8, wherein the multiplexer is configured to transmit firmware update data received at the second input and at the first data rate to the audio input of the audio device in a second portion of the bit period at the multiple of the first data rate.

10. The television of claim 1, wherein the television is selectively connectable to a remote server to receive firmware update data for the audio device.

11. A system for updating the firmware of an audio device comprising:
    the television of claim 1;
    an audio device comprising an audio processor, a central processing unit, and a demultiplexer, wherein the demultiplexer comprises a multiplexed data signal input, a demultiplexed firmware update data signal output operatively connected the central processing unit and a demultiplexed audio data signal output operatively connected to the central processing unit.

12. The system of claim 11, further comprising an audio device transceiver connected to the audio device input.

13. The television of claim 1, wherein the audio data signal input receives an audio data signal at a first rate, the television further comprising a processor, and a non-transitory, computer readable medium having instructions stored thereon which, when executed by the processor selectively connects the multiplexer output to one of the first and second input at a specified switching frequency and transmits data from the one of the first and second input at a multiple of the first rate.

14. A television, comprising:
    a multiplexer configured to multiplex audio data and firmware update data for an audio device and transmit multiplexed audio data and firmware update data to the audio device; and
    a data stream clock and synchronization module, wherein the data stream clock and synchronization module has an audio data rate signal input and a clock signal output, wherein the clock signal output is connected to a clock signal input of the multiplexer.

15. A system for updating firmware of an audio device, comprising:
    an audio device connected to a television via an HDMI ARC cable, wherein the television comprises a multiplexer having a clock signal input, a data stream clock and synchronization module having an audio data rate signal input, and a clock signal output, and wherein the clock signal output is connected to a clock signal input of the multiplexer, and the television is configured to transmit firmware update data to the audio device via an audio return channel of the HDMI ARC cable, and the audio device comprises a demultiplexer configured to demultiplex a data signal comprising multiplexed audio data and firmware update data and an embedded synchronization clock signal.

16. A method of updating firmware in an audio device connected to a television:
    receiving an audio data signal;
    receiving a firmware update data signal;
    multiplexing the audio data signal and the firmware update signal and embedding a synchronization clock signal to create a multiplexed signal; and
    transmitting the multiplexed signal to the audio device.

17. The method of claim 16, wherein the step of receiving the audio data signal comprises receiving the audio data signal at a first rate, and step of multiplexing the audio data signal and the firmware update signal to create a multiplexed signal comprises transmitting the audio data at a rate that is a multiple of the first rate during a subperiod of one selected from a frame period and bit period.

18. The method of claim 16, wherein the step of transmitting the multiplexed signal to the audio device further comprises transmitting the multiplexed signal through the audio return channel of an HDMI ARC cable.

19. A method of updating firmware in an audio device, the method comprising:
   receiving a data signal comprising multiplexed audio and firmware update data signals and an embedded synchronization clock signal; and
   demultiplexing the data signal comprising multiplexed audio and firmware update data signals and an embedded synchronization clock signal to define a demultiplexed audio signal and a demultiplexed firmware update signal; and
   playing the demultiplexed audio signal.

20. The method of claim 19, wherein the step of receiving a data signal comprising multiplexed audio and firmware update data signals and an embedded synchronization clock signal comprises receiving the data signal comprising multiplexed audio and firmware update data signals and an embedded synchronization clock signal via an audio return channel of an HDMI cable.

21. An audio device, comprising:
   an audio input configured to receive audio signals from an audio source;
   a central processing unit;
   a firmware data demultiplexer operatively connected to the audio input and the processor, wherein the demultiplexer is operable to demultiplex a data signal comprising multiplexed audio data and firmware update data signals and an embedded synchronization clock signal received via the audio input.

22. The audio device of 22, wherein the demultiplexer comprises a control signal input operatively connected to the central processing unit, a demultiplexed audio signal output operatively connected to an audio processor, and a demultiplexed firmware update signal output operatively connected to a firmware update receiver, and wherein the audio processor and the firmware update receiver are operatively connected to the central processing unit.

23. The audio device of claim 22, further comprising a non-transitory computer readable medium having computer executable instructions stored thereon which, when executed by the central processing unit, cause a control signal to be transmitted to the control signal input, and wherein a value of the control signal determines whether a signal received by the audio input during a specified period is transmitted to the audio processor 1506 or the firmware update receiver.

\* \* \* \* \*

UNITED STATES PATENT AND TRADEMARK OFFICE
CERTIFICATE OF CORRECTION

| | | |
|---|---|---|
| PATENT NO. | : 12,067,384 B2 | Page 1 of 1 |
| APPLICATION NO. | : 17/827139 | |
| DATED | : August 20, 2024 | |
| INVENTOR(S) | : W. Leo Hoarty | |

It is certified that error appears in the above-identified patent and that said Letters Patent is hereby corrected as shown below:

In the Claims

In Column 20, Line 27, between "processor" and "or" delete "1506"

Signed and Sealed this
First Day of October, 2024

*Katherine Kelly Vidal*

Katherine Kelly Vidal
*Director of the United States Patent and Trademark Office*